US011606134B2

United States Patent
Apaydin et al.

(10) Patent No.: US 11,606,134 B2
(45) Date of Patent: Mar. 14, 2023

(54) BEAMFORMER LATTICE FOR PHASED ARRAY ANTENNAS

(71) Applicant: Space Exploration Technologies Corp., Hawthorne, CA (US)

(72) Inventors: Nil Apaydin, Kirkland, WA (US); Chiara Pelletti, San Francisco, CA (US); Souren Shamsinejad, Hawthorne, CA (US); Alireza Mahanfar, Kirkland, WA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 1 day.

(21) Appl. No.: 17/471,098

(22) Filed: Sep. 9, 2021

(65) Prior Publication Data

US 2022/0069887 A1 Mar. 3, 2022

Related U.S. Application Data

(62) Division of application No. 16/276,278, filed on Feb. 14, 2019, now Pat. No. 11,146,323.
(Continued)

(51) Int. Cl.
*H04B 7/08* (2006.01)
*H01Q 21/06* (2006.01)
(Continued)

(52) U.S. Cl.
CPC .............. *H04B 7/086* (2013.01); *H01Q 1/38* (2013.01); *H01Q 21/061* (2013.01); *H01Q 21/22* (2013.01); *H04B 7/0617* (2013.01)

(58) Field of Classification Search
CPC ........ H04B 7/086; H04B 7/0617; H01Q 1/38; H01Q 21/061; H01Q 21/22; H01Q 21/0025; H01Q 21/20; H01P 5/12
See application file for complete search history.

(56) References Cited

U.S. PATENT DOCUMENTS 3,747,114 A * 7/1973 Shyhalla ............. H01Q 21/062
333/243
5,274,391 A * 12/1993 Connolly ............... H01Q 21/10
343/789
(Continued)

FOREIGN PATENT DOCUMENTS

KR   1020110027494 A   3/2011
KR    101454878 A    11/2014

OTHER PUBLICATIONS

International Search Report and Written Opinion dated Jun. 7, 2019, issued in corresponding International Application No. PCT/US2019/018064, filed Feb. 14, 2019, 11 pages.
(Continued)

*Primary Examiner* — Hafizur Rahman
*Assistant Examiner* — Kimberly E Glenn
(74) *Attorney, Agent, or Firm* — Polsinelli PC

(57) ABSTRACT

In some embodiments, an apparatus includes a plurality of first conductive traces oriented in a first direction in a first layer and plurality of second conductive traces oriented in a second direction in a second layer coupled by vias to define first hierarchical networks. A plurality of third conductive traces oriented in the first direction in a third layer and a plurality of fourth conductive traces oriented in the second direction in a fourth layer are coupled by vias to define second hierarchical networks. Open ends of the first or second traces at a last stage of the first hierarchical networks comprise first ends and open ends of the third or fourth traces at a last stage of the second hierarchical networks comprise second ends. A first end and a corresponding second end are non-collinear to each other and perpendicular to a major plane of the first layer.

4 Claims, 27 Drawing Sheets

Related U.S. Application Data

(60) Provisional application No. 62/631,707, filed on Feb. 17, 2018, provisional application No. 62/631,195, filed on Feb. 15, 2018.

(51) Int. Cl.
  *H04B 7/06* (2006.01)
  *H01Q 1/38* (2006.01)
  *H01Q 21/22* (2006.01)

(56) References Cited

U.S. PATENT DOCUMENTS

| | | | |
|---|---|---|---|
| 6,167,286 | A | 12/2000 | Ward et al. |
| 7,626,556 | B1 | 12/2009 | Pluymers et al. |
| 8,217,839 | B1 * | 7/2012 | Paulsen .................. H01Q 21/10 343/810 |
| 9,379,437 | B1 | 6/2016 | Stutzke et al. |
| 9,531,085 | B2 * | 12/2016 | Miraftab ............ H01Q 21/0037 |
| 10,333,633 | B2 | 6/2019 | Petersson et al. |
| 10,553,940 | B1 | 2/2020 | Bongard |
| 2003/0076274 | A1 | 4/2003 | Phelan et al. |
| 2003/0151550 | A1 | 8/2003 | Chen et al. |
| 2007/0063898 | A1 | 3/2007 | Phelan et al. |
| 2007/0152886 | A1 | 7/2007 | Baliarda et al. |
| 2008/0150832 | A1 | 6/2008 | Ingram et al. |
| 2008/0278370 | A1 | 11/2008 | Lachner et al. |
| 2008/0291101 | A1 | 11/2008 | Braunstein et al. |
| 2008/0297414 | A1 | 12/2008 | Krishnaswamy et al. |
| 2009/0009392 | A1 | 1/2009 | Jacomb-Hood et al. |
| 2010/0026574 | A1 | 2/2010 | Pozgay |
| 2013/0194152 | A1 | 8/2013 | FractusS |
| 2014/0266897 | A1 | 9/2014 | Jakoby et al. |
| 2015/0015453 | A1 | 1/2015 | Puzella et al. |
| 2016/0172755 | A1 | 6/2016 | Chen et al. |

OTHER PUBLICATIONS

International Search Report and Written Opinion dated Jun. 4, 2019, issued in corresponding International Application No. PCT/US2019/018096, filed Feb. 14, 2019, 17 pages.

International Search Report and Written Opinion dated Apr. 10, 2020, issued in corresponding International Application No. PCT/US2019/018092, filed Feb. 14, 2019, 15 pages.

* cited by examiner

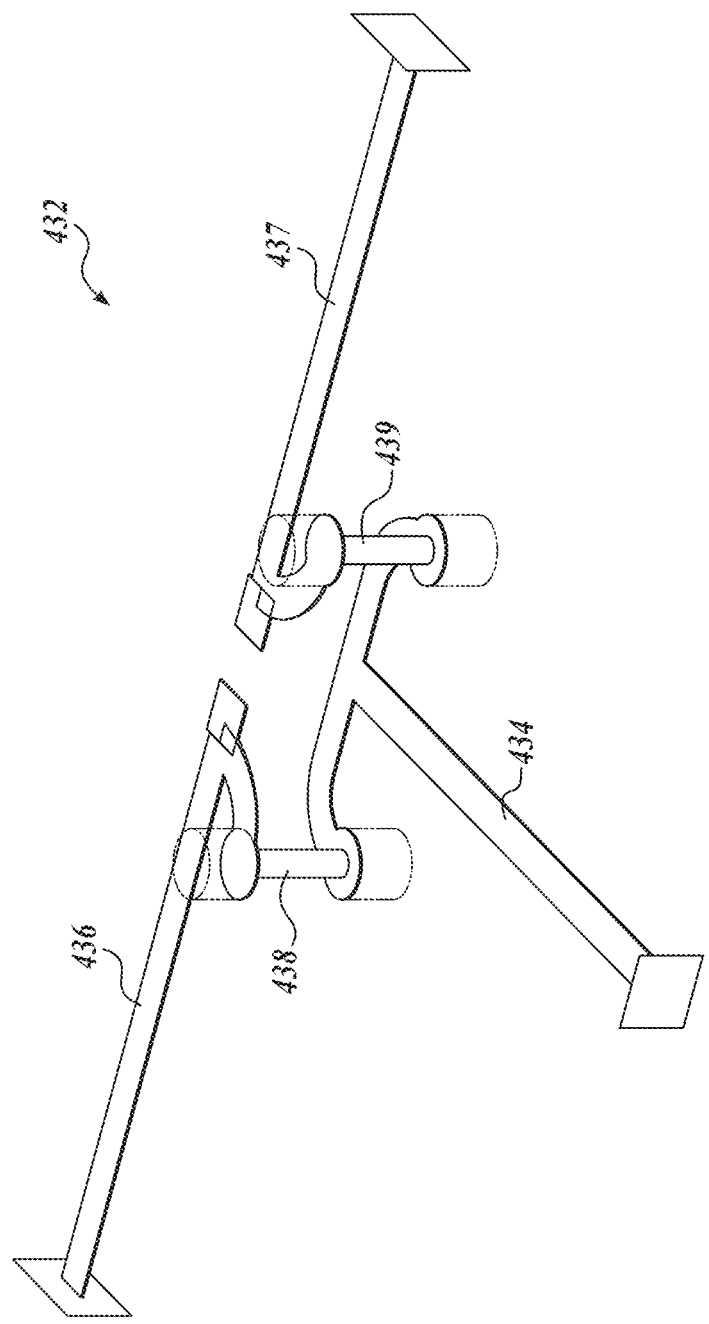

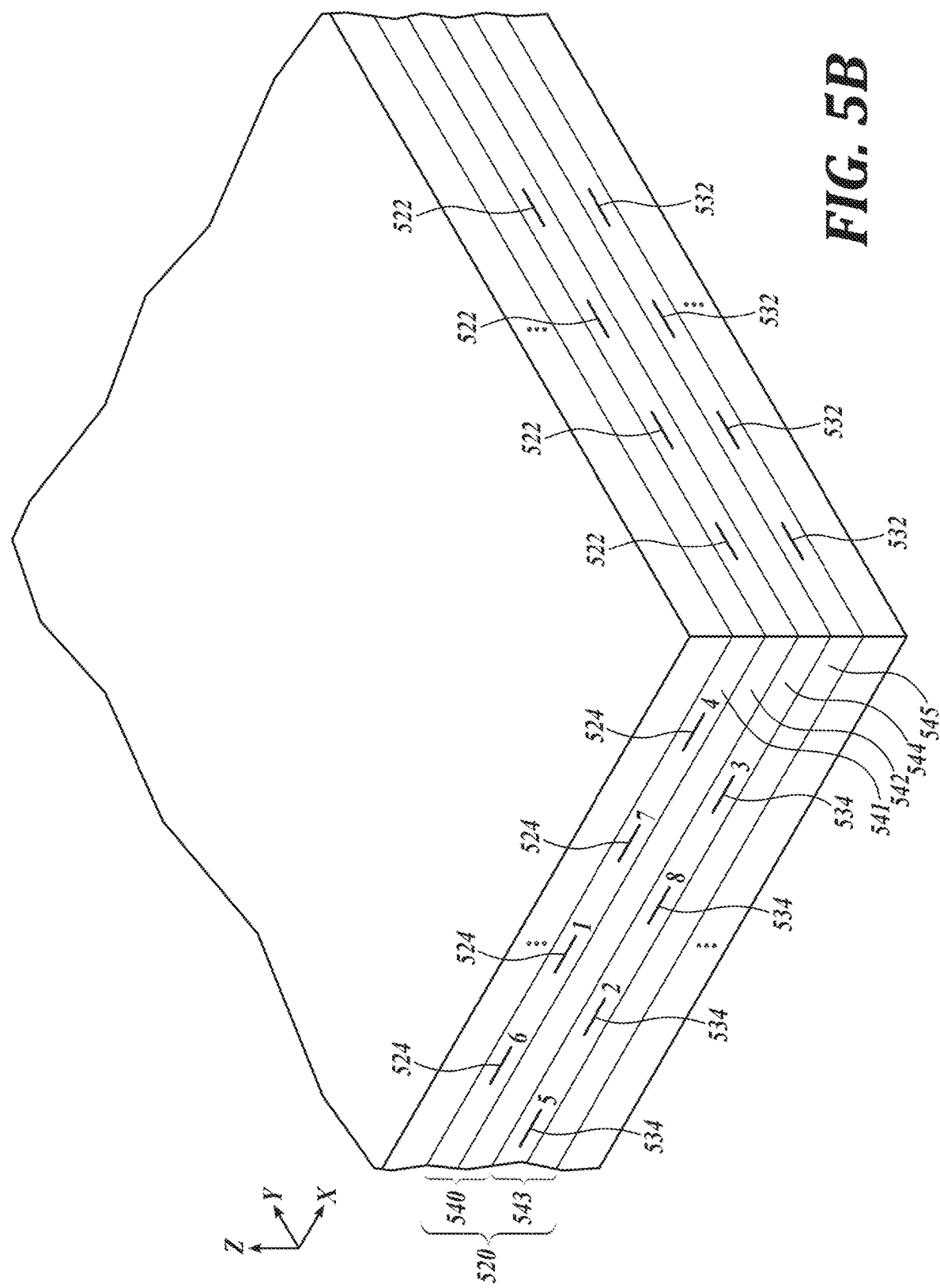

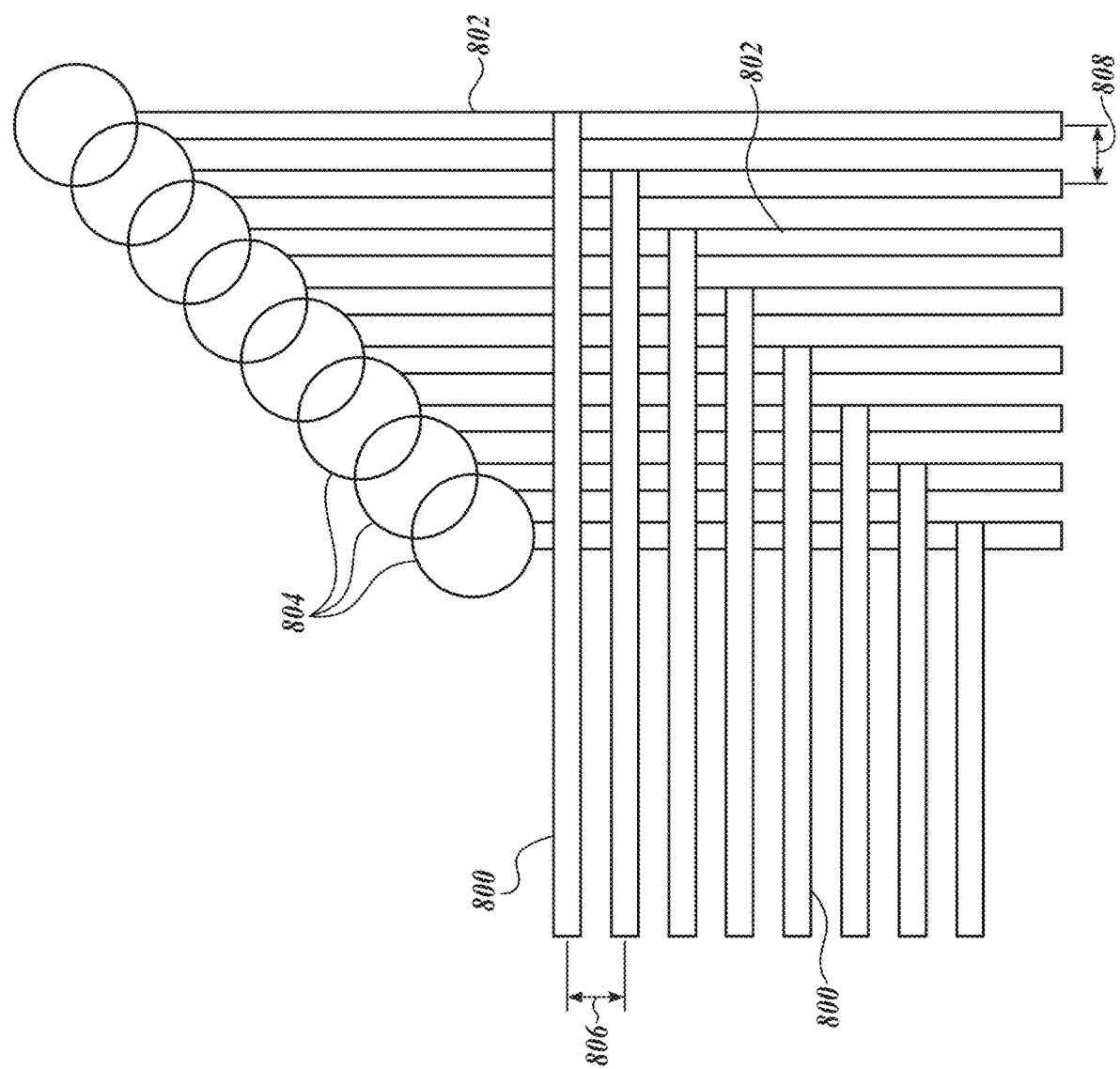

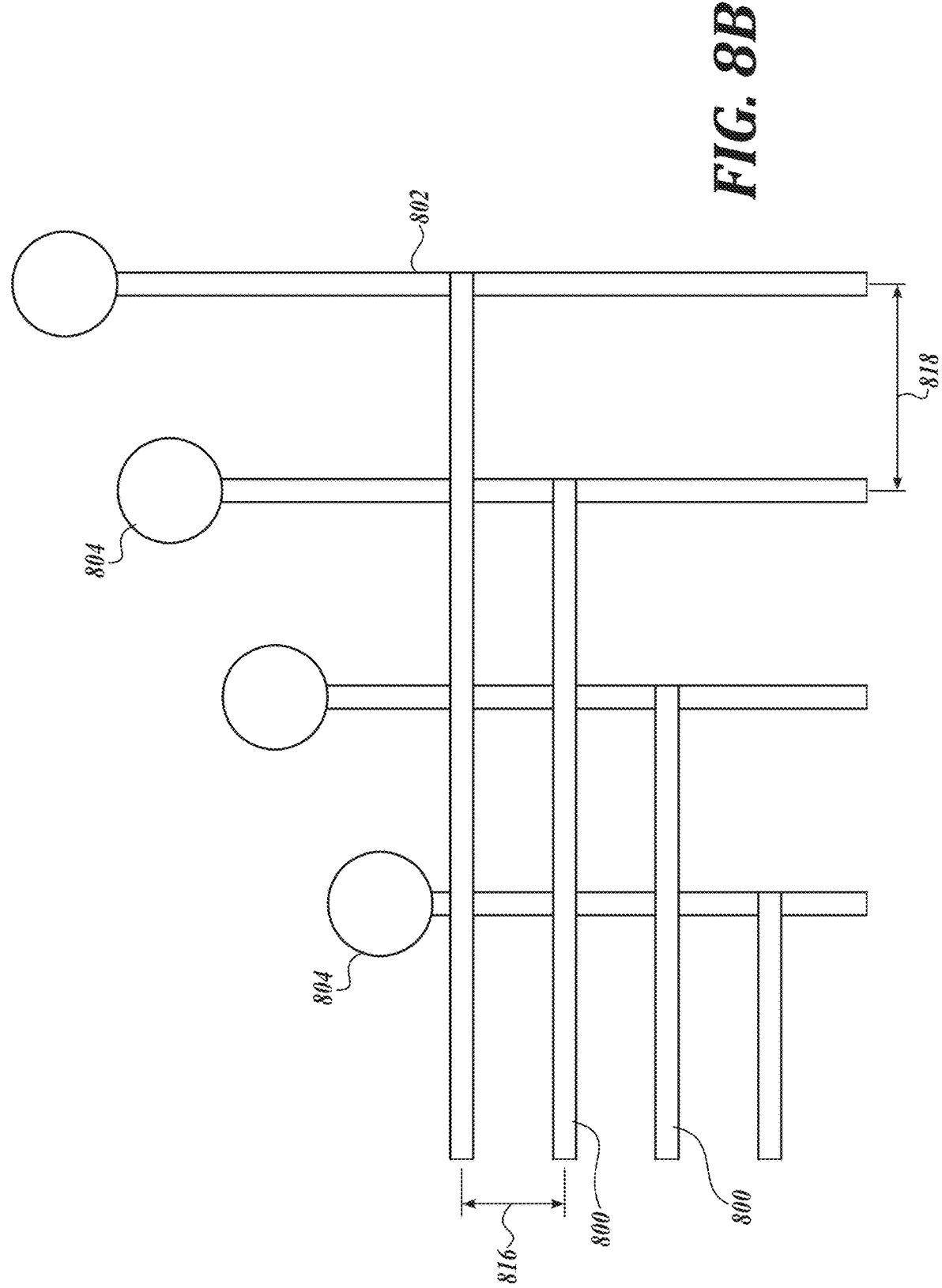

BEAMFORMER LATTICE FOR PHASED ARRAY ANTENNAS

CROSS REFERENCE TO RELATED APPLICATIONS

This application is a divisional application of U.S. patent application Ser. No. 16/276,278 filed Feb. 14, 2019, which claims the benefit of U.S. Provisional Patent Application No. 62/631,707 filed Feb. 17, 2018 and U.S. Provisional Patent Application No. 62/631,195 filed Feb. 15, 2018, the disclosures all of which are hereby incorporated by reference in their entirety herein.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna system can be formed from a set of antenna elements to simulate a large directional antenna. An advantage of a phased array antenna system is its ability to transmit and/or receive signals in a preferred direction (e.g., the antenna's beamforming ability) without physical repositioning or reorientating.

It would be advantageous to configure phased array antenna systems having increased bandwidth while maintaining a high ratio of the main lobe power to the side lobe power. Likewise, it would be advantageous to configure phased array antenna systems having reduced weight, reduced size, lower manufacturing cost, and/or lower power requirements. Accordingly, embodiments of the present disclosure are directed to these and other improvements in phase array antenna systems or portions thereof.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an apparatus includes a beamformer including a plurality of inputs and a plurality of outputs; a plurality of input vias; and a plurality of output vias. Each input of the plurality of inputs electrically couples to a respective input via of the plurality of input vias. Each output of the plurality of outputs electrically couples to a respective output via of the plurality of output vias. The beamformer is included in a first layer. The plurality of input vias are configured to electrically couple to termination trace ends of a plurality of hierarchical networks provided on at least second and third layers. The plurality of hierarchical networks comprises at least three hierarchical networks.

In some embodiments, an apparatus includes a plurality of beamformer cells arranged in a particular arrangement in a first layer. Each beamformer cell of the plurality of beamformer cells includes a beamformer including a plurality of inputs and a plurality of outputs, a plurality of input vias having first and second ends, and a plurality of output vias having third and fourth ends. Each first end of an input via of the plurality of input vias electrically couples to a respective input of the plurality of inputs and each second end of the input via of the plurality of input vias electrically couples to a terminating trace segment of a multiplex feed network located in a second layer. Each third end of an output via of the plurality of output vias electrically couples to a respective output of the plurality of outputs and each fourth end of the output via of the plurality of output vias electrically couples to an antenna element of a plurality of antenna elements located in a third layer. Each beamformer cell of the plurality of beamformer cells is positioned in the first layer to minimize routing distance to associated antenna elements.

In some embodiments, an apparatus includes a plurality of first electrically conductive traces oriented in a first direction in a first layer of a stack; a plurality of second electrically conductive traces oriented in a second direction, different from the first direction, in a second layer of the stack; a plurality of first vias electrically coupling the plurality of first electrically conductive traces to respective traces of the plurality of second electrically conductive traces to define a plurality of first hierarchical networks; a plurality of third electrically conductive traces oriented in the first direction in a third layer of the stack; a plurality of fourth electrically conductive traces oriented in the second direction in a fourth layer of the stack; and a plurality of second vias electrically coupling the plurality of third electrically conductive traces to respective traces of the plurality of fourth electrically conductive traces to define a plurality of second hierarchical networks. Open ends of the first or second traces at a last stage of the plurality of first hierarchical networks comprise a plurality of first ends and open ends of the third or fourth traces at a last stage of the plurality of second hierarchical networks comprise a plurality of second ends. A first end of the plurality of first ends and a corresponding second end of the plurality of second ends are non-collinear to each other in a direction perpendicular to a major plane of the first layer.

In some embodiments, an apparatus includes a beamformer including a plurality of inputs and a plurality of outputs, a plurality of input vias, a first electrically conductive trace segment extending from a first last stage node of a first hierarchical network, and a second electrically conductive trace segment extending from a second last stage node of a second hierarchical network. The beamformer is included in a first printed circuit board (PCB) layer. Each input of the plurality of inputs electrically couples to a respective input via of the plurality of input vias. The first electrically conductive trace segment includes a first termination end at an end opposite the first last stage node, wherein the first termination end electrically couples to a first input via of the plurality of input vias. The second electrically conductive trace segment includes a second termination end at an end opposite the second last stage node, wherein the second termination end electrically couples to a second input via of the plurality of input vias. The first hierarchical network is disposed above and aligned with the second hierarchical network, wherein the first and second electrically conductive trace segments are differently shaped from each other.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4B-4D depict additional views of a multiplex feed network according to some embodiments of the present disclosure.

FIG. 5B depicts a perspective view of a portion of the stack including the multiplex feed network configured as eight H-networks according to some embodiments of the present disclosure.

FIGS. 8A-8B depict example simplified top views of eight and four H-networks, respectively, arranged in two layers according to some embodiments of the present disclosure.

DETAILED DESCRIPTION

Figure 1A:
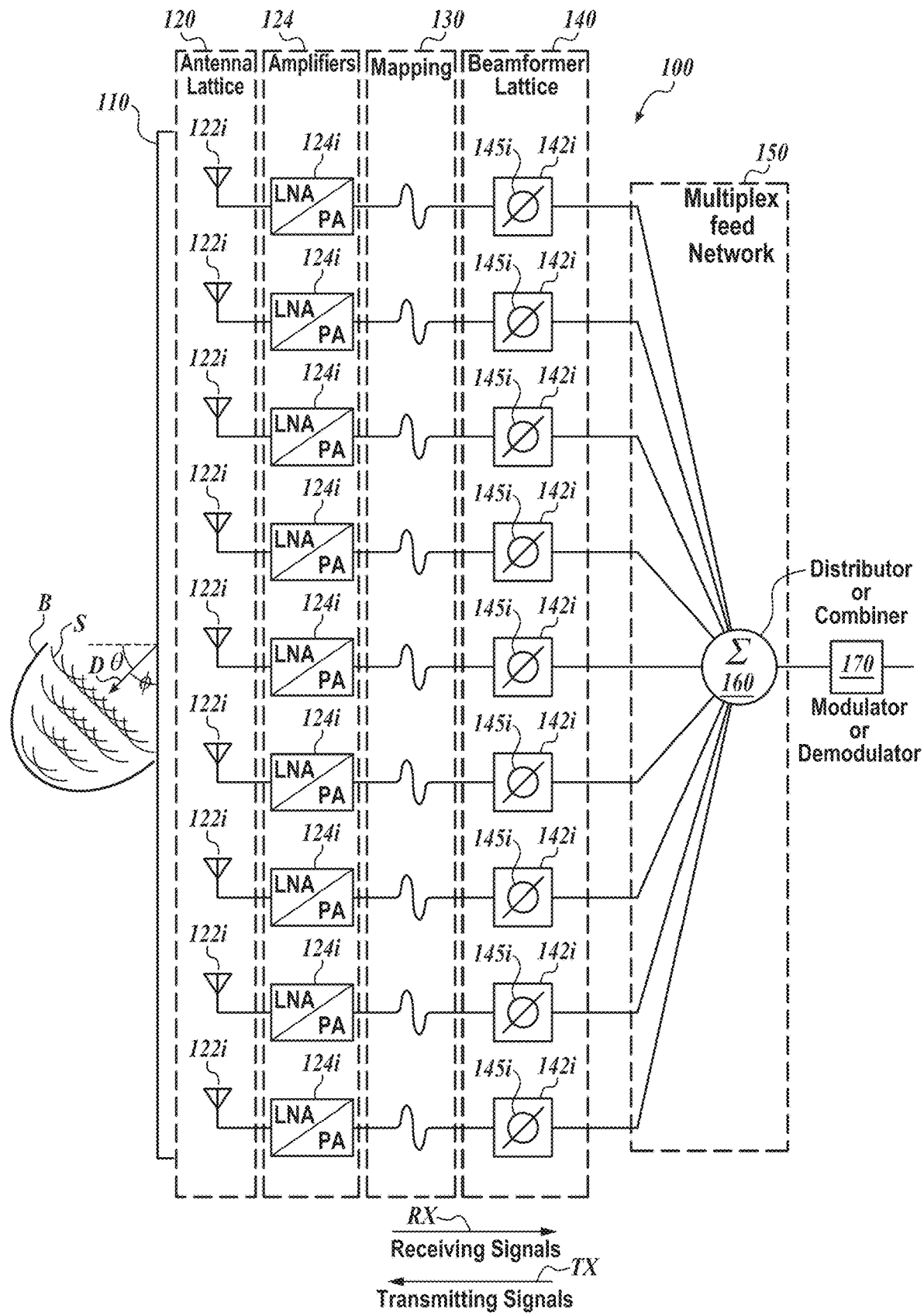
FIG. 1A illustrates a schematic of an electrical configuration for a phased array antenna system in accordance with one embodiment of the present disclosure including an antenna lattice defining an antenna aperture, mapping, a beamformer lattice, a multiplex feed network, a distributor or combiner, and a modulator or demodulator.

Embodiments of apparatuses and methods relate to beamformer lattices included in phased array antenna systems. In some embodiments, an apparatus includes a beamformer including a plurality of inputs and a plurality of outputs, a plurality of input vias, a plurality of output vias, and a plurality of radio frequency (RF) filters. Each input of the plurality of inputs electrically couples to a respective input via of the plurality of input vias. Each output of the plurality of outputs electrically couples to a respective output via of the plurality of output vias. Each RF filter of the plurality of RF filters is disposed between and electrically couples to a respective output of the plurality of outputs and a respective output via of the plurality of output vias. The beamformer and the plurality of RF filters are included in a first printed circuit board (PCB) layer. The plurality of input vias are configured to electrically couple to termination trace ends of a plurality of hierarchical networks provided on at least second and third PCB layers. The plurality of hierarchical networks comprises at least three hierarchical networks. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C).

Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/ controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a cathode ray tube (CRT) display or liquid crystal display (LCD).

FIG. 1A is a schematic illustration of a phased array antenna system 100 in accordance with embodiments of the present disclosure. The phased array antenna system 100 is designed and configured to transmit or receive a combined beam B composed of signals S (also referred to as electromagnetic signals, wavefronts, or the like) in a preferred direction D from or to an antenna aperture 110. (Also see the combined beam B and antenna aperture 110 in FIG. 1B). The direction D of the beam B may be normal to the antenna aperture 110 or at an angle θ from normal.

Referring to FIG. 1A, the illustrated phased array antenna system 100 includes an antenna lattice 120, a mapping system 130, a beamformer lattice 140, a multiplex feed network 150 (or a hierarchical network or an H-network), a combiner or distributor 160 (a combiner for receiving signals or a distributor for transmitting signals), and a modulator or demodulator 170. The antenna lattice 120 is configured to transmit or receive a combined beam B of radio frequency signals S having a radiation pattern from or to the antenna aperture 110.

In accordance with embodiments of the present disclosure, the phased array antenna system 100 may be a multi-beam phased array antenna system, in which each beam of the multiple beams may be configured to be at different angles, different frequency, and/or different polarization.

In the illustrated embodiment, the antenna lattice 120 includes a plurality of antenna elements 122$i$. A corresponding plurality of amplifiers 124$i$ are coupled to the plurality of antenna elements 122$i$. The amplifiers 124$i$ may be low noise amplifiers (LNAs) in the receiving direction RX or power amplifiers (PAs) in the transmitting direction TX. The plurality of amplifiers 124$i$ may be combined with the plurality of antenna elements 122$i$ in for example, an antenna module or antenna package. In some embodiments, the plurality of amplifiers 124$i$ may be located in another lattice separate from the antenna lattice 120.

Figure 1B:
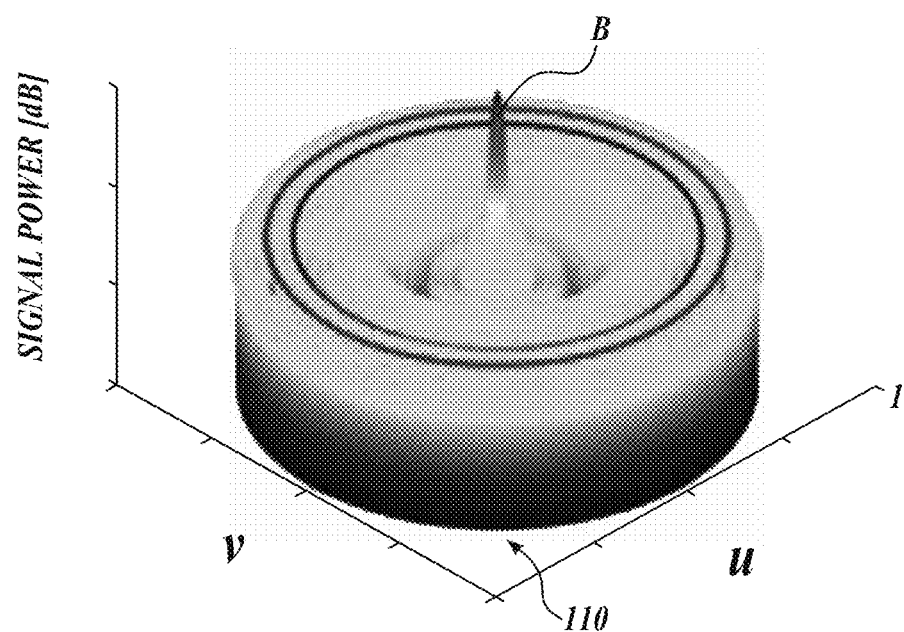
FIG. 1B illustrates a signal radiation pattern achieved by a phased array antenna aperture in accordance with one embodiment of the present disclosure.

Multiple antenna elements 122$i$ in the antenna lattice 120 are configured for transmitting signals (see the direction of arrow TX in FIG. 1A for transmitting signals) or for receiving signals (see the direction of arrow RX in FIG. 1A for receiving signals). Referring to FIG. 1B, the antenna aperture 110 of the phased array antenna system 100 is the area through which the power is radiated or received. In accordance with one embodiment of the present disclosure, an exemplary phased array antenna radiation pattern from a phased array antenna system 100 in the u/v plane is provided in FIG. 1B. The antenna aperture has desired pointing angle D and an optimized beam B, for example, reduced side lobes Ls to optimize the power budget available to the main lobe Lm or to meet regulatory criteria for interference, as per regulations issued from organizations such as the Federal Communications Commission (FCC) or the International Telecommunication Union (ITU). (See FIG. 1F for a description of side lobes Ls and the main lobe Lm.)

Figure 1C:
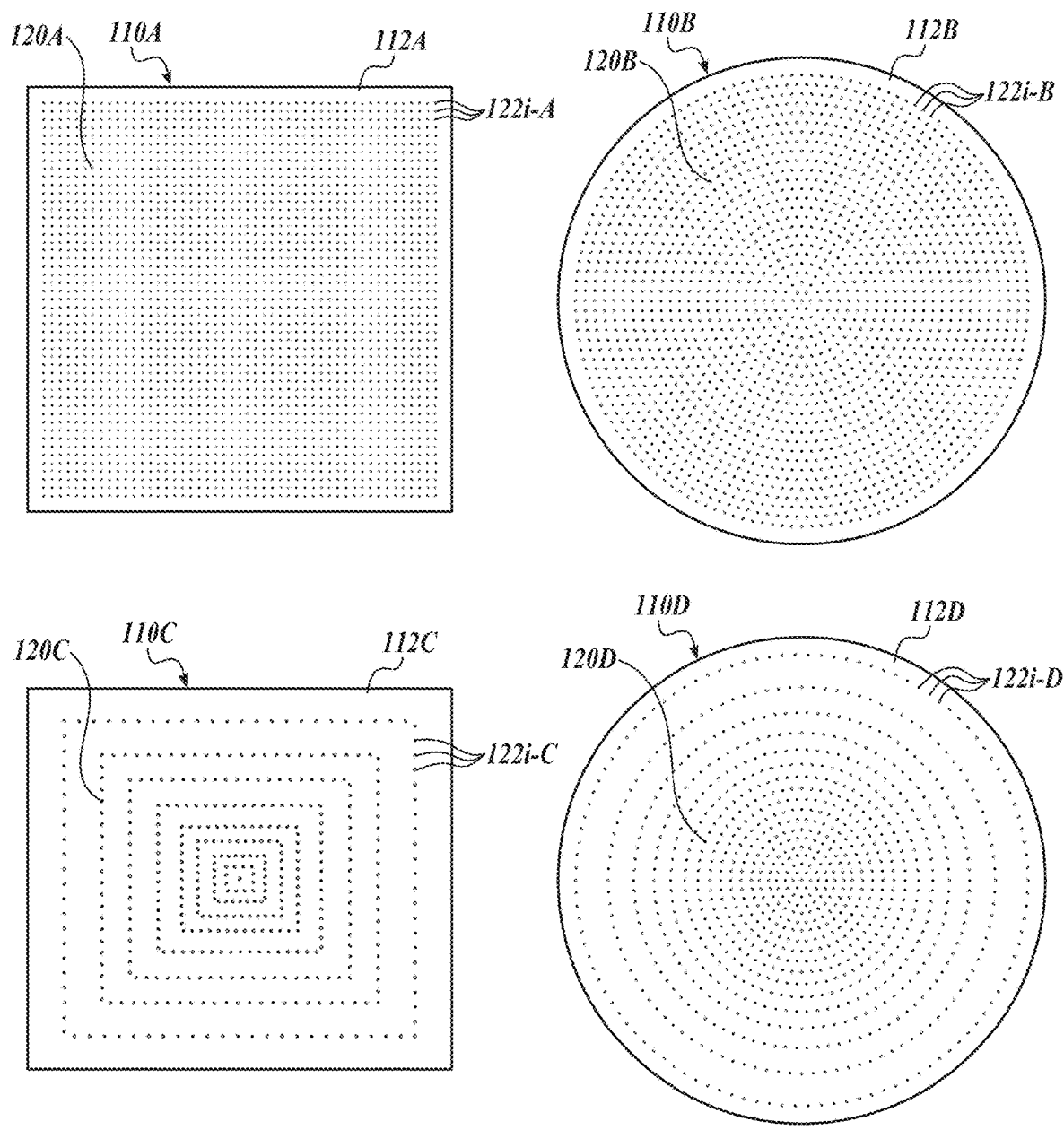
FIG. 1C illustrates schematic layouts of individual antenna elements of phased array antennas to define various antenna apertures in accordance with embodiments of the present disclosure (e.g., rectangular, circular, space tapered).

Referring to FIG. 1C, in some embodiments (see embodiments 120A, 120B, 120C, 120D), the antenna lattice 120 defining the antenna aperture 110 may include the plurality of antenna elements 122$i$ arranged in a particular configuration on a printed circuit board (PCB), ceramic, plastic, glass, or other suitable substrate, base, carrier, panel, or the like (described herein as a carrier 112). The plurality of antenna elements 122$i$, for example, may be arranged in concentric circles, in a circular arrangement, in columns and rows in a rectilinear arrangement, in a radial arrangement, in equal or uniform spacing between each other, in non-uniform spacing between each other, or in any other arrangement. Various example arrangements of the plurality of antenna elements 122$i$ in antenna lattices 120 defining antenna apertures (110A, 110B, 110C, and 110D) are shown, without limitation, on respective carriers 112A, 112B, 112C, and 112D in FIG. 1C.

The beamformer lattice 140 includes a plurality of beamformers 142$i$ including a plurality of phase shifters 145$i$. In the receiving direction RX, the beamformer function is to delay the signals arriving from each antenna element so the signals all arrive to the combining network at the same time. In the transmitting direction TX, the beamformer function is to delay the signal sent to each antenna element such that all signals arrive at the target location at the same time. This delay can be accomplished by using "true time delay" or a phase shift at a specific frequency.

Following the transmitting direction of arrow TX in the schematic illustration of FIG. 1A, in a transmitting phased array antenna system 100, the outgoing radio frequency (RF) signals are routed from the modulator 170 via the distributer 160 to a plurality of individual phase shifters 145$i$ in the beamformer lattice 140. The RF signals are phase-offset by the phase shifters 145$i$ by different phases, which vary by a predetermined amount from one phase shifter to another. Each frequency needs to be phased by a specific amount in order to maintain the beam performance. If the phase shift applied to different frequencies follows a linear behavior, the phase shift is referred to as "true time delay". Common phase shifters, however, apply a constant phase offset for all frequencies.

For example, the phases of the common RF signal can be shifted by 0° at the bottom phase shifter 145i in FIG. 1A, by Δα at the next phase shifter 145i in the column, by 24a at the next phase shifter, and so on. As a result, the RF signals that arrive at amplifiers 124i (when transmitting, the amplifiers are power amplifiers "PAs") are respectively phase-offset from each other. The PAs 124i amplify these phase-offset RF signals, and antenna elements 122i emit the RF signals S as electromagnetic waves.

Because of the phase offsets, the RF signals from individual antenna elements 122i are combined into outgoing wave fronts that are inclined at angle ϕ from the antenna aperture 110 formed by the lattice of antenna elements 122i. The angle ϕ is called an angle of arrival (AoA) or a beamforming angle. Therefore, the choice of the phase offset Δα determines the radiation pattern of the combined signals S defining the wave front. In FIG. 1B, an exemplary phased array antenna radiation pattern of signals S from an antenna aperture 110 in accordance with one embodiment of the present disclosure is provided.

Following the receiving direction of arrow RX in the schematic illustration of FIG. 1A, in a receiving phased array antenna system 100, the signals S defining the wave front are detected by individual antenna elements 122i, and amplified by amplifiers 124i (when receiving signals the amplifiers are low noise amplifiers "LNAs"). For any non-zero AoA, signals S comprising the same wave front reach the different antenna elements 122i at different times. Therefore, the received signal will generally include phase offsets from one antenna element of the receiving (RX) antenna element to another. Analogously to the emitting phased array antenna case, these phase offsets can be adjusted by phase shifters 145i in the beamformer lattice 140. For example, each phase shifter 145i (e.g., a phase shifter chip) can be programmed to adjust the phase of the signal to the same reference, such that the phase offset among the individual antenna elements 122i is canceled in order to combine the RF signals corresponding to the same wave front. As a result of this constructive combining of signals, a higher signal to noise ratio (SNR) can be attained on the received signal, which results in increased channel capacity.

Still referring to FIG. 1A, a mapping system 130 may be disposed between the antenna lattice 120 and the beamformer lattice 140 to provide length matching for equidistant electrical connections between each antenna element 122i of the antenna lattice 120 and the phase shifters 145i in the beamformer lattice 140, as will be described in greater detail below. A multiplex feed or hierarchical network 150 may be disposed between the beamformer lattice 140 and the distributor/combiner 160 to distribute a common RF signal to the phase shifters 145i of the beamformer lattice 140 for respective appropriate phase shifting and to be provided to the antenna elements 122i for transmission, and to combine RF signals received by the antenna elements 122i, after appropriate phase adjustment by the beamformers 142i.

In accordance with some embodiments of the present disclosure, the antenna elements 122i and other components of the phased array antenna system 100 may be contained in an antenna module to be carried by the carrier 112. (See, for example, antenna modules 226a and 226b in FIG. 2B). In the illustrated embodiment of FIG. 2B, there is one antenna element 122i per antenna module 226a. However, in other embodiments of the present disclosure, antenna modules 226a may incorporate more than one antenna element 122i.

Figure 1D:
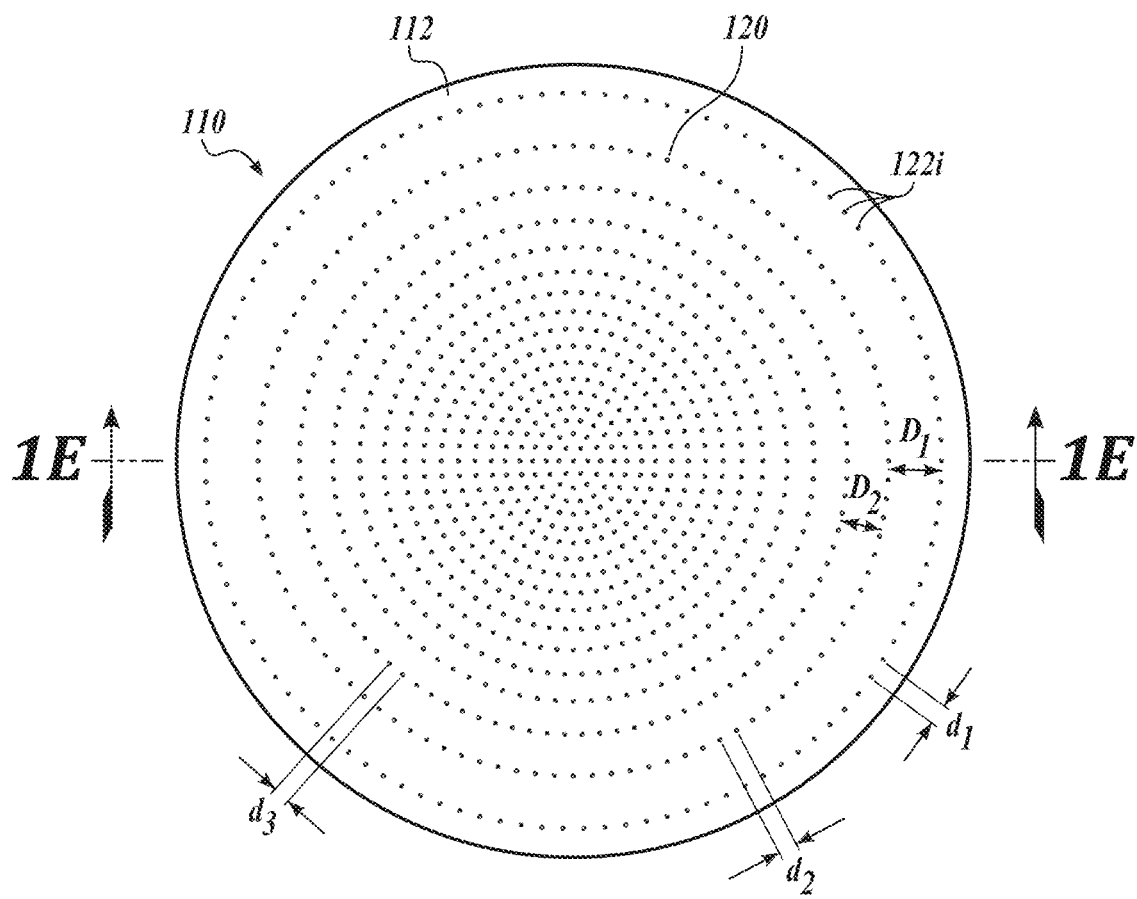
FIG. 1D illustrates individual antenna elements in a space tapered configuration to define an antenna aperture in accordance with embodiments of the present disclosure.
Figure 1E:
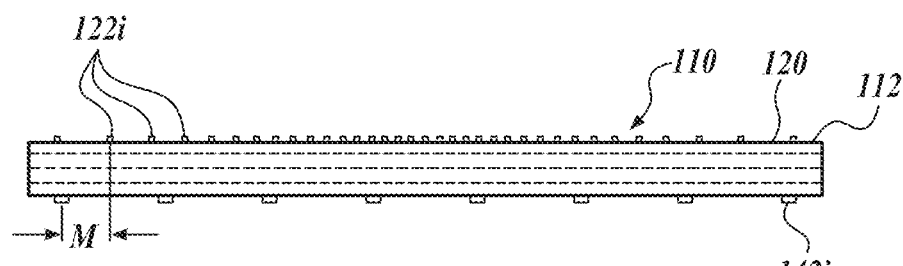
FIG. 1E is a cross-sectional view of a panel defining the antenna aperture in FIG. 1D.

Referring to FIGS. 1D and 1E, an exemplary configuration for an antenna aperture 120 in accordance with one embodiment of the present disclosure is provided. In the illustrated embodiment of FIGS. 1D and 1E, the plurality of antenna elements 122i in the antenna lattice 120 are distributed with a space taper configuration on the carrier 112. In accordance with a space taper configuration, the number of antenna elements 122i changes in their distribution from a center point of the carrier 112 to a peripheral point of the carrier 112. For example, compare spacing between adjacent antenna elements 122i, D1 to D2, and compare spacing between adjacent antenna elements 122i, d1, d2, and d3. Although shown as being distributed with a space taper configuration, other configurations for the antenna lattice are also within the scope of the present disclosure.

The system 100 includes a first portion carrying the antenna lattice 120 and a second portion carrying a beamformer lattice 140 including a plurality of beamformer elements. As seen in the cross-sectional view of FIG. 1E, multiple layers of the carrier 112 carry electrical and electromagnetic connections between elements of the phased array antenna system 100. In the illustrated embodiment, the antenna elements 122i are located the top surface of the top layer and the beamformer elements 142i are located on the bottom surface of the bottom layer. While the antenna elements 122i may be configured in a first arrangement, such as a space taper arrangement, the beamformer elements 142i may be arranged in a second arrangement different from the antenna element arrangement. For example, the number of antenna elements 122i may be greater than the number of beamformer elements 142i, such that multiple antenna elements 122i correspond to one beamformer element 142i. As another example, the beamformer elements 142i may be laterally displaced from the antenna elements 122i on the carrier 112, as indicated by distance M in FIG. 1E. In one embodiment of the present disclosure, the beamformer elements 142i may be arranged in an evenly spaced or organized arrangement, for example, corresponding to an H-network, or a cluster network, or an unevenly spaced network such as a space tapered network different from the antenna lattice 120. In some embodiments, one or more additional layers may be disposed between the top and bottom layers of the carrier 112. Each of the layers may comprise one or more PCB layers.

Figure 1F:
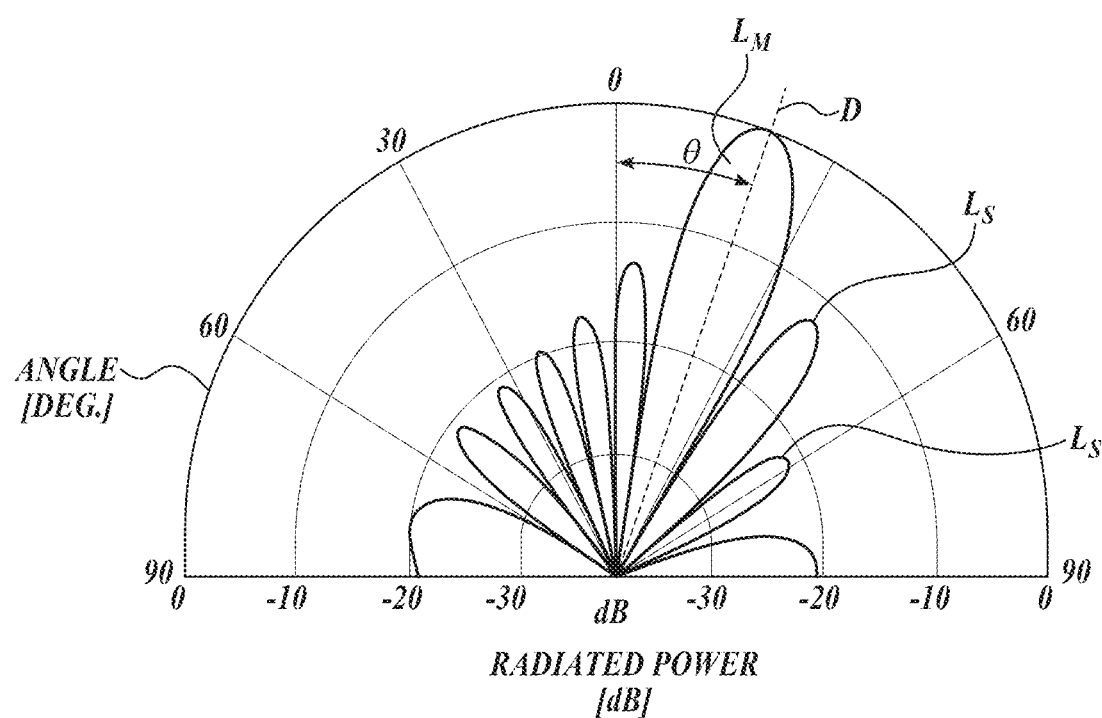
FIG. 1F is a graph of a main lobe and undesirable side lobes of an antenna signal.

Referring to FIG. 1F, a graph of a main lobe Lm and side lobes Ls of an antenna signal in accordance with embodiments of the present disclosure is provided. The horizontal (also the radial) axis shows radiated power in dB. The angular axis shows the angle of the RF field in degrees. The main lobe Lm represents the strongest RF field that is generated in a preferred direction by a phased array antenna system 100. In the illustrated case, a desired pointing angle D of the main lobe Lm corresponds to about 20°. Typically, the main lobe Lm is accompanied by a number of side lobes Ls. However, side lobes Ls are generally undesirable because they derive their power from the same power budget thereby reducing the available power for the main lobe Lm. Furthermore, in some instances the side lobes Ls may reduce the SNR of the antenna aperture 110. Also, side lobe reduction is important for regulation compliance.

One approach for reducing side lobes Ls is arranging elements 122i in the antenna lattice 120 with the antenna elements 122i being phase offset such that the phased array antenna system 100 emits a waveform in a preferred direction D with reduced side lobes. Another approach for reducing side lobes Ls is power tapering. However, power tapering is generally undesirable because by reducing the power of the side lobe Ls, the system has increased design complexity of requiring of "tunable and/or lower output" power amplifiers.

In addition, a tunable amplifier 124$i$ for output power has reduced efficiency compared to a non-tunable amplifier. Alternatively, designing different amplifiers having different gains increases the overall design complexity and cost of the system.

Yet another approach for reducing side lobes Ls in accordance with embodiments of the present disclosure is a space tapered configuration for the antenna elements 122$i$ of the antenna lattice 120. (See the antenna element 122$i$ configuration in FIGS. 1C and 1D.) Space tapering may be used to reduce the need for distributing power among antenna elements 122$i$ to reduce undesirable side lobes Ls. However, in some embodiments of the present disclosure, space taper distributed antenna elements 122$i$ may further include power or phase distribution for improved performance.

In addition to undesirable side lobe reduction, space tapering may also be used in accordance with embodiments of the present disclosure to reduce the number of antenna elements 122$i$ in a phased array antenna system 100 while still achieving an acceptable beam B from the phased array antenna system 100 depending on the application of the system 100. (For example, compare in FIG. 1C the number of space-tapered antenna elements 122$i$ on carrier 112D with the number of non-space tapered antenna elements 122$i$ carried by carrier 112B.)

Figure 1G:
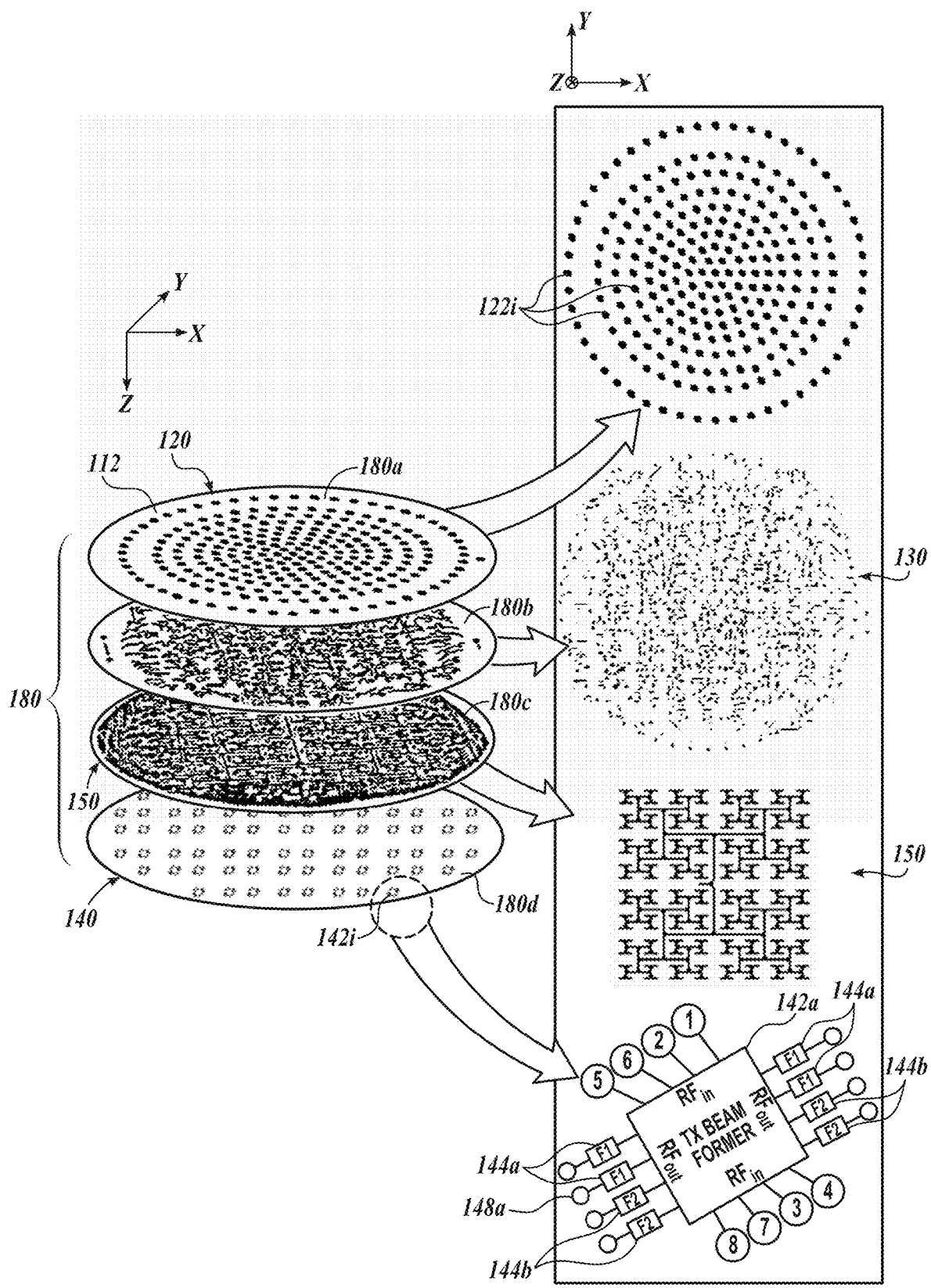
FIG. 1G illustrates an isometric view of a plurality of stack-up layers which make up a phased array antenna system in accordance with one embodiment of the present disclosure.

FIG. 1G depicts an exemplary configuration of the phased array antenna system 100 implemented as a plurality of PCB layers in lay-up 180 in accordance with embodiments of the present disclosure. The plurality of PCB layers in lay-up 180 may comprise a PCB layer stack including an antenna layer 180$a$, a mapping layer 180$b$, a multiplex feed network layer 180$c$, and a beamformer layer 180$d$. In the illustrated embodiment, mapping layer 180$b$ is disposed between the antenna layer 180$a$ and multiplex feed network layer 180$c$, and the multiplex feed network layer 180$c$ is disposed between the mapping layer 180$b$ and the beamformer layer 180$d$.

Although not shown, one or more additional layers may be disposed between layers 180$a$ and 180$b$, between layers 180$b$ and 180$c$, between layers 180$c$ and 180$d$, above layer 180$a$, and/or below layer 180$d$. Each of the layers 180$a$, 180$b$, 180$c$, and 180$d$ may comprise one or more PCB sub-layers. In other embodiments, the order of the layers 180$a$, 180$b$, 180$c$, and 180$d$ relative to each other may differ from the arrangement shown in FIG. 1G. For instance, in other embodiments, beamformer layer 180$d$ may be disposed between the mapping layer 180$b$ and multiplex feed network layer 180$c$.

Layers 180$a$, 180$b$, 180$c$, and 180$d$ may include electrically conductive traces (such as metal traces that are mutually separated by electrically isolating polymer or ceramic), electrical components, mechanical components, optical components, wireless components, electrical coupling structures, electrical grounding structures, and/or other structures configured to facilitate functionalities associated with the phase array antenna system 100. Structures located on a particular layer, such as layer 180$a$, may be electrically interconnected with vertical vias (e.g., vias extending along the z-direction of a Cartesian coordinate system) to establish electrical connection with particular structures located on another layer, such as layer 180$d$.

Antenna layer 180$a$ may include, without limitation, the plurality of antenna elements 122$i$ arranged in a particular arrangement (e.g., a space taper arrangement) as an antenna lattice 120 on the carrier 112. Antenna layer 180$a$ may also include one or more other components, such as corresponding amplifiers 124$i$. Alternatively, corresponding amplifiers 124$i$ may be configured on a separate layer. Mapping layer 180$b$ may include, without limitation, the mapping system 130 and associated carrier and electrical coupling structures. Multiplex feed network layer 180$c$ may include, without limitation, the multiplex feed network 150 and associated carrier and electrical coupling structures. Beamformer layer 180$d$ may include, without limitation, the plurality of phase shifters 145$i$, other components of the beamformer lattice 140, and associated carrier and electrical coupling structures. Beamformer layer 180$d$ may also include, in some embodiments, modulator/demodulator 170 and/or coupler structures. In the illustrated embodiment of FIG. 1G, the beamformers 142$i$ are shown in phantom lines because they extend from the underside of the beamformer layer 180$d$.

Although not shown, one or more of layers 180$a$, 180$b$, 180$c$, or 180$d$ may itself comprise more than one layer. For example, mapping layer 180$b$ may comprise two or more layers, which in combination may be configured to provide the routing functionality discussed above. As another example, multiplex feed network layer 180$c$ may comprise two or more layers, depending upon the total number of multiplex feed networks included in the multiplex feed network 150.

Figure 2A:
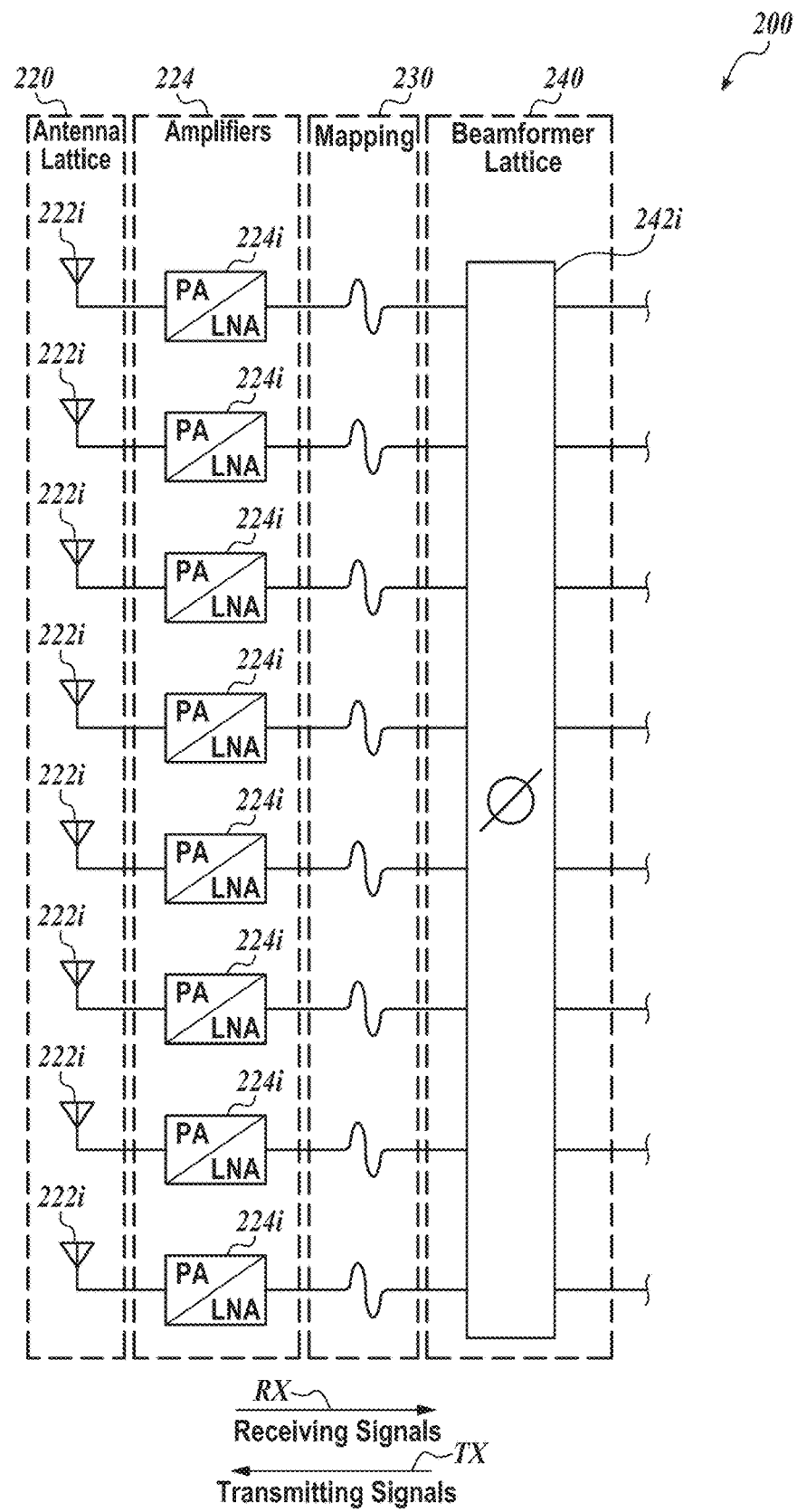
FIG. 2A illustrates a schematic of an electrical configuration for multiple antenna elements in an antenna lattice coupled to a single beamformer in a beamformer lattice in accordance with one embodiment of the present disclosure.

In accordance with embodiments of the present disclosure, the phased array antenna system 100 may be a multi-beam phased array antenna system. In a multi-beam phased array antenna configuration, each beamformer 142$i$ may be electrically coupled to more than one antenna element 122$i$. The total number of beamformer 142$i$ may be smaller than the total number of antenna elements 122$i$. For example, each beamformer 142$i$ may be electrically coupled to four antenna elements 122$i$ or to eight antenna elements 122$i$. FIG. 2A illustrates an exemplary multi-beam phased array antenna system in accordance with one embodiment of the present disclosure in which eight antenna elements 222$i$ are electrically coupled to one beamformer 242$i$. In other embodiments, each beamformer 142$i$ may be electrically coupled to more than eight antenna elements 122$i$.

Figure 2B:
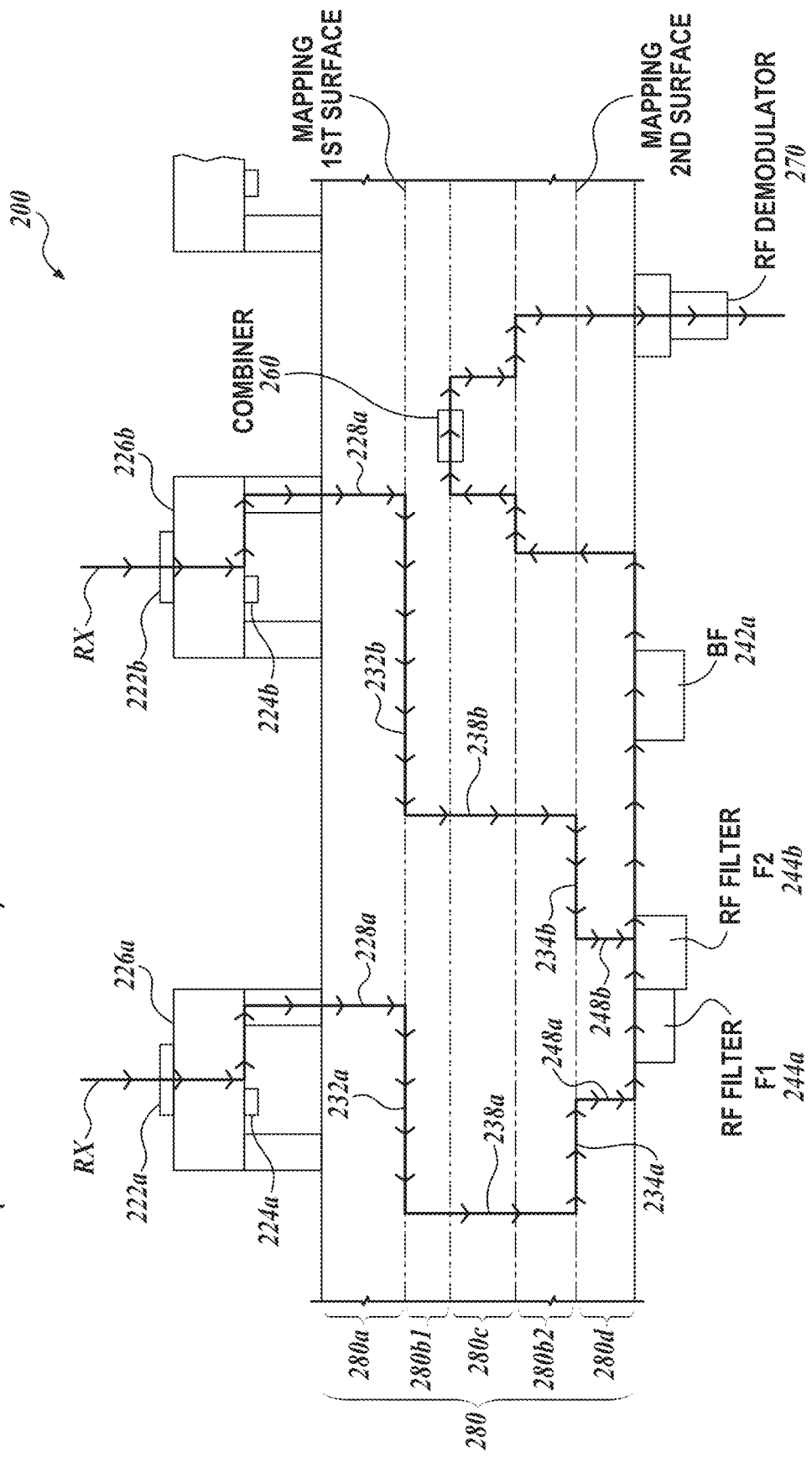
FIG. 2B illustrates a schematic cross section of a plurality of stack-up layers which make up a phased array antenna system in an exemplary receiving system in accordance with the electrical configuration of FIG. 2A.

FIG. 2B depicts a partial, close-up, cross-sectional view of an exemplary configuration of the phased array antenna system 200 of FIG. 2A implemented as a plurality of PCB layers 280 in accordance with embodiments of the present disclosure. Like part numbers are used in FIG. 2B as used in FIG. 1G with similar numerals, but in the 200 series.

In the illustrated embodiment of FIG. 2B, the phased array antenna system 200 is in a receiving configuration (as indicated by the arrows RX). Although illustrated as in a receiving configuration, the structure of the embodiment of FIG. 2B may be modified to be also be suitable for use in a transmitting configuration.

Signals are detected by the individual antenna elements 222$a$ and 222$b$, shown in the illustrated embodiment as being carried by antenna modules 226$a$ and 226$b$ on the top surface of the antenna lattice layer 280$a$. After being received by the antenna elements 222$a$ and 222$b$, the signals are amplified by the corresponding low noise amplifiers (LNAs) 224$a$ and 224$b$, which are also shown in the illustrated embodiment as being carried by antenna modules 226$a$ and 226$b$ on a top surface of the antenna lattice layer 280$a$.

In the illustrated embodiment of FIG. 2B, a plurality of antenna elements 222$a$ and 222$b$ in the antenna lattice 220 are coupled to a single beamformer 242$a$ in the beamformer lattice 240 (as described with reference to FIG. 2A). However, a phased array antenna system implemented as a plurality of PCB layers having a one-to-one ratio of antenna elements to beamformer elements or having a greater than one-to-one ratio are also within the scope of the present disclosure. In the illustrated embodiment of FIG. 2B, the beamformers 242i are coupled to the bottom surface of the beamformer layer 280d.

In the illustrated embodiment, the antenna elements 222i and the beamformer elements 242i are configured to be on opposite surfaces of the lay-up of PCB layers 280. In other embodiments, beamformer elements may be co-located with antenna elements on the same surface of the lay-up. In other embodiments, beamformers may be located within an antenna module or antenna package.

As previously described, electrical connections coupling the antenna elements 222a and 222b of the antenna lattice 220 on the antenna layer 280a to the beamformer elements 242a of the beamformer lattice 240 on the beamformer layer 280d are routed on surfaces of one or more mapping layers 280b1 and 280b2 using electrically conductive traces. Exemplary mapping trace configurations for a mapping layer are provided in layer 130 of FIG. 1G.

In the illustrated embodiment, the mapping is shown on top surfaces of two mapping layers 280b1 and 280b2. However, any number of mapping layers may be used in accordance with embodiments of the present disclosure, including a single mapping layer. Mapping traces on a single mapping layer cannot cross other mapping traces. Therefore, the use of more than one mapping layer can be advantageous in reducing the lengths of the electrically conductive mapping traces by allowing mapping traces in horizontal planes to cross an imaginary line extending through the lay-up 280 normal to the mapping layers and in selecting the placement of the intermediate vias between the mapping traces.

In addition to mapping traces on the surfaces of layers 280b1 and 280b2, mapping from the antenna lattice 220 to the beamformer lattice 240 further includes one or more electrically conductive vias extending vertically through one or more of the plurality of PCB layers 280.

In the illustrated embodiment of FIG. 2B, a first mapping trace 232a between first antenna element 222a and beamformer element 242a is formed on the first mapping layer 280b1 of the lay-up of PCB layers 280. A second mapping trace 234a between the first antenna element 222a and beamformer element 242a is formed on the second mapping layer 280b2 of the lay-up of PCB layers 280. An electrically conductive via 238a connects the first mapping trace 232a to the second mapping trace 234a. Likewise, an electrically conductive via 228a connects the antenna element 222a (shown as connecting the antenna module 226a including the antenna element 222a and the amplifier 224a) to the first mapping trace 232a. Further, an electrically conductive via 248a connects the second mapping trace 234a to RF filter 244a and then to the beamformer element 242a, which then connects to combiner 260 and RF demodulator 270.

Of note, via 248a corresponds to via 148a and filter 244a corresponds to filter 144a, both shown on the surface of the beamformer layer 180d in the previous embodiment of FIG. 1G. In some embodiments of the present disclosure, filters may be omitted depending on the design of the system.

Similar mapping connects the second antenna element 222b to RF filter 244b and then to the beamformer element 242a. The second antenna element 222b may operate at the same or at a different value of a parameter than the first antenna element 222a (for example at different frequencies). If the first and second antenna elements 222a and 222b operate at the same value of a parameter, the RF filters 244a and 244b may be the same. If the first and second antenna elements 222a and 222b operate at different values, the RF filters 244a and 244b may be different.

Mapping traces and vias may be formed in accordance with any suitable methods. In one embodiment of the present disclosure, the lay-up of PCB layers 280 is formed after the multiple individual layers 280a, 280b, 280c, and 280d have been formed. For example, during the manufacture of layer 280a, electrically conductive via 228a may be formed through layer 280a. Likewise, during the manufacture of layer 280d, electrically conductive via 248a may be formed through layer 280d. When the multiple individual layers 280a, 280b, 280c, and 280d are assembled and laminated together, the electrically conductive via 228a through layer 280a electrically couples with the trace 232a on the surface of layer 280b1, and the electrically conductive via 248a through layer 280d electrically couples with the trace 234a on the surface of layer 280b2.

Other electrically conductive vias, such as via 238a coupling trace 232a on the surface of layer 280b1 and trace 234a on the surface of layer 280b2 can be formed after the multiple individual layers 280a, 280b, 280c, and 280d are assembled and laminated together. In this construction method, a hole may be drilled through the entire lay-up 280 to form the via, metal is deposited in the entirety of the hole forming an electrically connection between the traces 232a and 234a. In some embodiments of the present disclosure, excess metal in the via not needed in forming the electrical connection between traces 232a and 234a can be removed by back-drilling the metal at the top and/or bottom portions of the via. In some embodiments, back-drilling of the metal is not performed completely, leaving a via "stub". Tuning may be performed for a lay-up design with a remaining via "stub". In other embodiments, a different manufacturing process may produce a via that does not span more than the needed vertical direction.

As compared to the use of one mapping layer, the use of two mapping layers 280b1 and 280b2 separated by intermediate vias 238a and 238b as seen in the illustrated embodiment of FIG. 2B allows for selective placement of the intermediate vias 238a and 238b. If these vias are drilled though all the layers of the lay-up 280, they can be selectively positioned to be spaced from other components on the top or bottom surfaces of the lay-up 280.

Figure 3A:
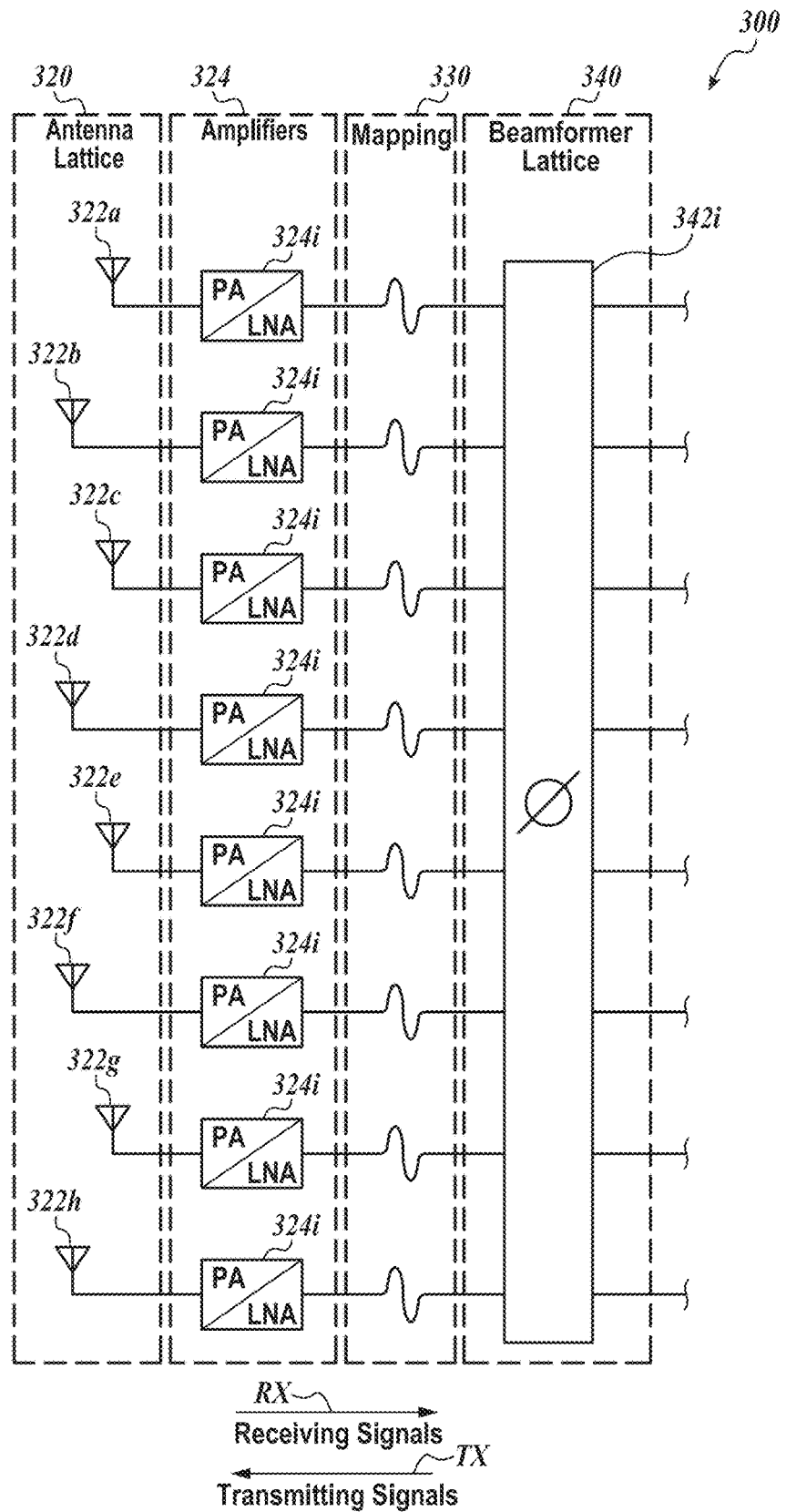
FIG. 3A illustrates a schematic of an electrical configuration for multiple interspersed antenna elements in an antenna lattice coupled to a single beamformer in a beamformer lattice in accordance with one embodiment of the present disclosure.
Figure 3B:
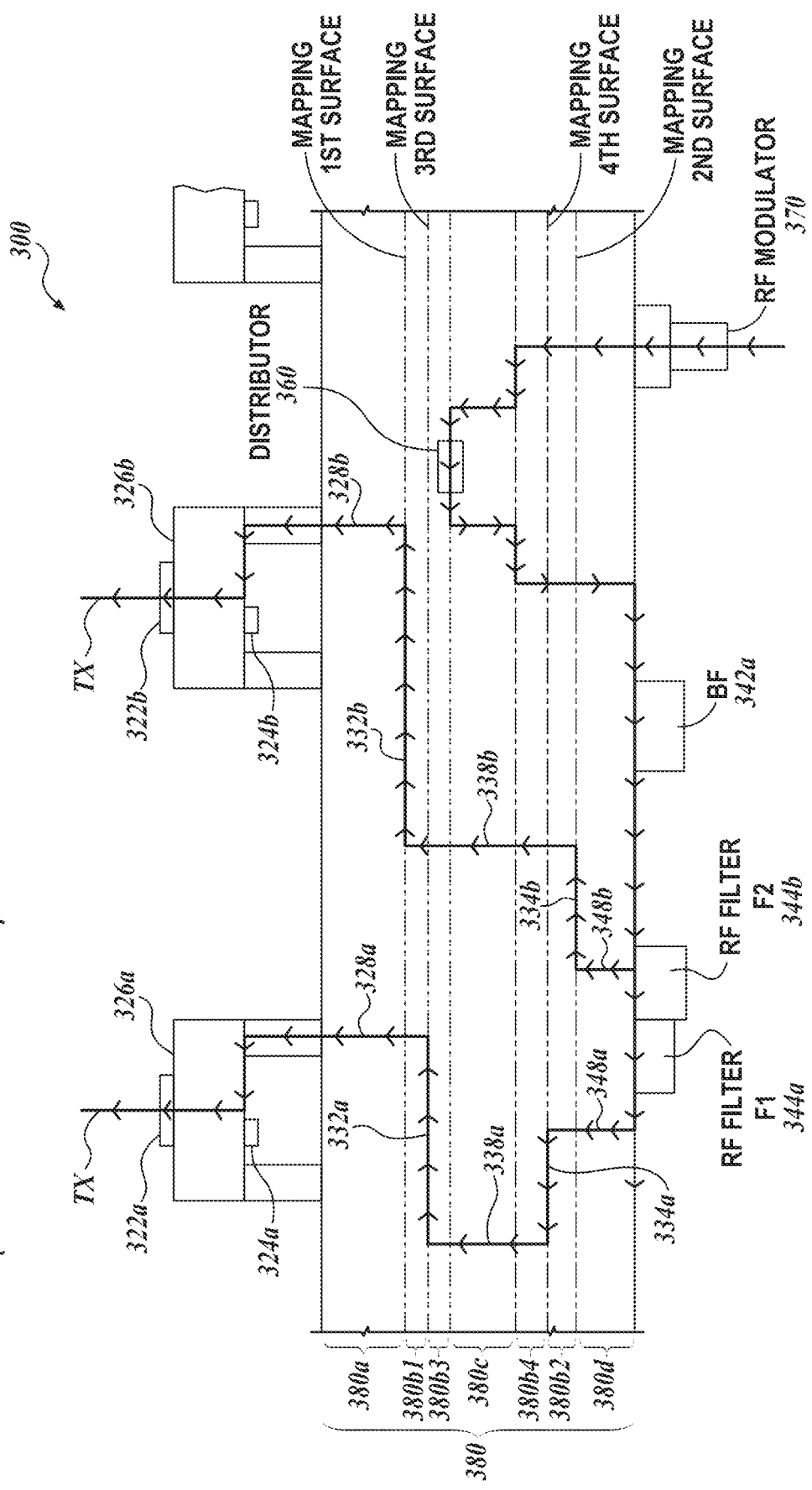
FIG. 3B illustrates a schematic cross section of a plurality of stack-up layers which make up a phased array antenna system in an exemplary transmitting and interspersed system in accordance with the electrical configuration of FIG. 3A.

FIGS. 3A and 3B are directed to another embodiment of the present disclosure. FIG. 3A illustrates an exemplary multi-beam phased array antenna system in accordance with one embodiment of the present disclosure in which eight antenna elements 322i are electrically coupled to one beamformer 342i, with the eight antenna elements 322i being into two different groups of interspersed antenna elements 322a and 322b.

FIG. 3B depicts a partial, close-up, cross-sectional view of an exemplary configuration of the phased array antenna system 300 implemented as a stack-up of a plurality of PCB layers 380 in accordance with embodiments of the present disclosure. The embodiment of FIG. 3B is similar to the embodiment of FIG. 2B, except for differences regarding interspersed antenna elements, the number of mapping layers, and the direction of signals, as will be described in greater detail below. Like part numbers are used in FIG. 3B as used in FIG. 3A with similar numerals, but in the 300 series.

In the illustrated embodiment of FIG. 3B, the phased array antenna system 300 is in a transmitting configuration (as indicated by the arrows TX). Although illustrated as in a transmitting configuration, the structure of the embodiment of FIG. 3B may be modified to also be suitable for use in a receiving configuration.

In some embodiments of the present disclosure, the individual antenna elements 322a and 322b may be configured to receive and/or transmit data at different values of one or more parameters (e.g., frequency, polarization, beam orientation, data streams, receive (RX)/transmit (TX) functions, time multiplexing segments, etc.). These different values may be associated with different groups of the antenna elements. For example, a first plurality of antenna elements carried by the carrier is configured to transmit and/or receive signals at a first value of a parameter. A second plurality of antenna elements carried by the carrier are configured to transmit and/or receive signals at a second value of the parameter different from the first value of the parameter, and the individual antenna elements of the first plurality of antenna elements are interspersed with individual antenna elements of the second plurality of antenna elements.

As a non-limiting example, a first group of antenna elements may receive data at frequency f1, while a second group of antenna elements may receive data at frequency f2.

The placement on the same carrier of the antenna elements operating at one value of the parameter (e.g., first frequency or wavelength) together with the antenna elements operating at another value of the parameter (e.g., second frequency or wavelength) is referred to herein as "interspersing". In some embodiments, the groups of antenna elements operating at different values of parameter or parameters may be placed over separate areas of the carrier in a phased array antenna. In some embodiments, at least some of the antenna elements of the groups of antenna elements operating at different values of at least one parameter are adjacent or neighboring one another. In other embodiments, most or all of the antenna elements of the groups of antenna elements operating at different values of at least one parameter are adjacent or neighboring one another.

In the illustrated embodiment of FIG. 3A, antenna elements 322a and 322b are interspersed antenna elements with first antenna element 322a communicating at a first value of a parameter and second antenna element 322a communicating at a second value of a parameter.

Although shown in FIG. 3A as two groups of interspersed antenna elements 322a and 322b in communication with a single beamformer 342a, the phased array antenna system 300 may be also configured such that one group of interspersed antenna elements communicate with one beamformer and another group of interspersed antenna elements communicate with another beamformer.

In the illustrated embodiment of FIG. 3B, the lay-up 380 includes four mapping layers 380b1, 380b2, 380b3, and 380b4, compared to the use of two mapping layers 280b1 and 280b2 in FIG. 2B. Mapping layers 380b1 and 380b2 are connected by intermediate via 338a. Mapping layers 380b3 and 380b4 are connected by intermediate via 338b. Like the embodiment of FIG. 2B, the lay-up 380 of the embodiment of FIG. 3B can allow for selective placement of the intermediate vias 338a and 338b, for example, to be spaced from other components on the top or bottom surfaces of the lay-up 380.

The mapping layers and vias can be arranged in many other configurations and on other sub-layers of the lay-up 180 than the configurations shown in FIGS. 2B and 3B. The use of two or more mapping layers can be advantageous in reducing the lengths of the electrically conductive mapping traces by allowing mapping traces in horizontal planes to cross an imaginary line extending through the lay-up normal to the mapping layers and in selecting the placement of the intermediate vias between the mapping traces. Likewise, the mapping layers can be configured to correlate to a group of antenna elements in an interspersed configuration. By maintaining consistent via lengths for each grouping by using the same mapping layers for each grouping, trace length is the only variable in length matching for each antenna to beamformer mapping for each grouping.

Beamformer Cells

Figure 4A:
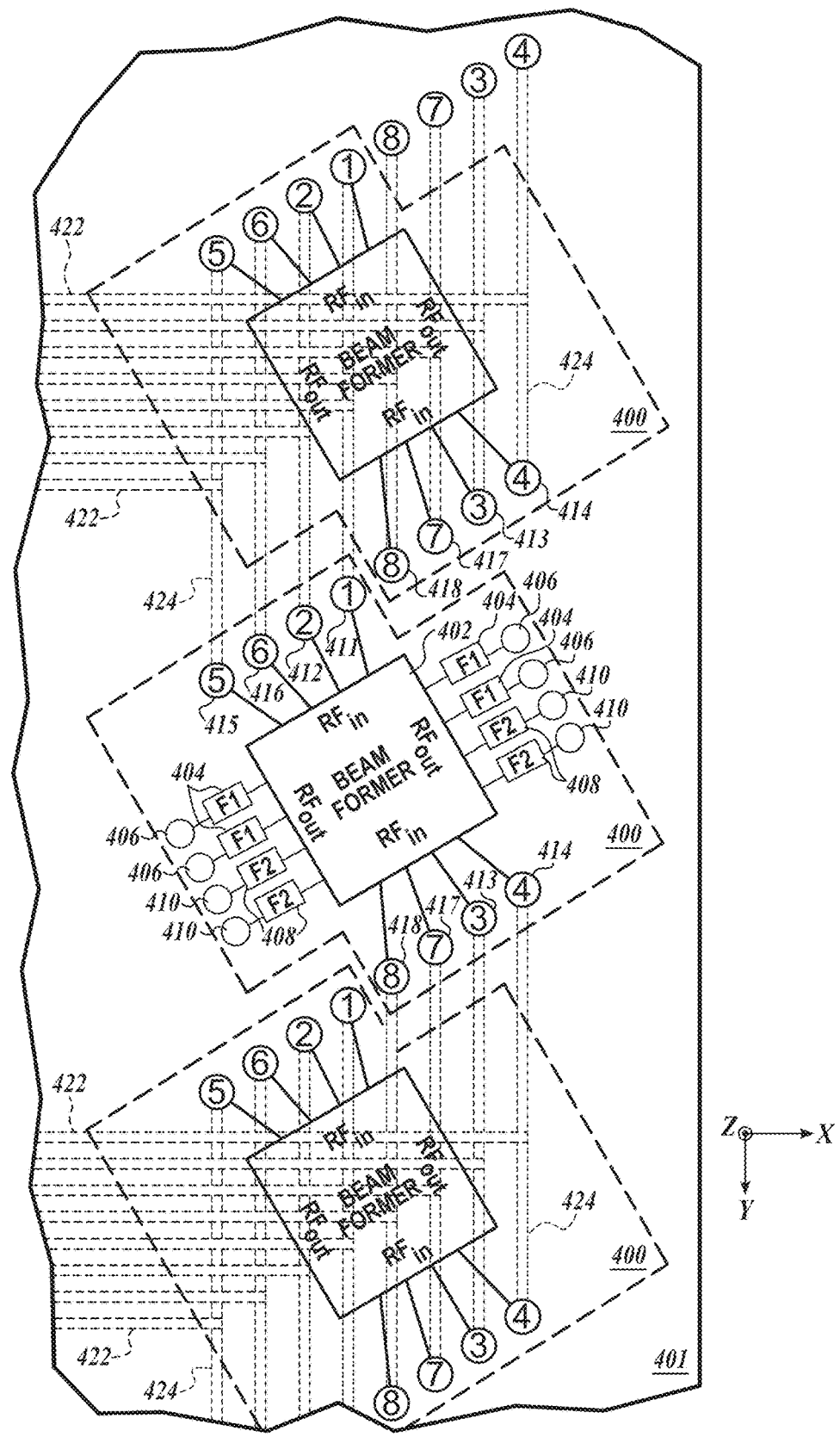
FIG. 4A depicts a block diagram of a portion of a beamformer lattice including a plurality of beamformer cells according to some embodiments of the present disclosure.

In some embodiments, the plurality of beamformers (e.g., beamformers 142i, 242i, or 342i) and associated structures included in a beamformer lattice (e.g., beamformer 140, 240, or 340) may be organized as a plurality of beamformer cells 400. FIG. 4A depicts a block diagram of a portion of a beamformer lattice including a plurality of beamformer cells 400 according to some embodiments of the present disclosure. The beamformer lattice may be implemented in a PCB layer 401. PCB layer 401 may be a layer similar to beamformer layer 180d and which may be included in a PCB layer stack similar to lay-up 180 of FIG. 1G. The Cartesian coordinate system denoted in FIG. 4A corresponds to that shown in FIG. 1G, in which FIG. 4A illustrates a bottom view of PCB layer 401 viewed upward from the underside of PCB layer 401 toward the layers above (e.g., viewed toward a multiplex feed network such as those implemented in multiplex feed network layer 180c). A multiplex feed network 420 is represented as dotted lines to denote its location in layers different from PCB layer 401.

Multiplex feed network 420, also referred to as a hierarchical network, may comprise a plurality of H-networks, and as an example, eight H-networks configured in two PCB layers, as will be described in detail below. Each H-network of the plurality of H-networks may comprise a plurality of horizontal conductive traces 422 (e.g., traces extending in the x-direction of the Cartesian coordinate system) and a plurality of vertical conductive traces 424 (e.g., traces extending in the y-direction of the Cartesian coordinate system). All of the horizontal traces 422 of the plurality of H-networks may be provided in one PCB layer, and all of the vertical traces 424 of the plurality of H-networks may be provided in another PCB layer. In some embodiments, the configuration of the beamformer cells 400 with multiplex feed network 420 may be associated with a receiver panel, embodiments in which all of the multiplex feed networks are configured within two PCB layers, for a certain number of beamformers (e.g., less than 256 beamformers), and/or the like.

Although eight H-networks are discussed herein, it is understood that fewer or more than eight H-networks are within the scope of embodiments of the present disclosure. Each multiplex feed network of the plurality of multiplex feed networks 420 may comprise, without limitation, electrically conductive traces arranged or configured as a hierarchical network, a fractal network, a self-similar fractal network, a tree network, a star network, a hybrid network, a rectilinear network, a curvilinear network, a H-network (also referred to as a H-tree network), a rectilinear H-network, a curvilinear H-network, or other networks in which each signal inputted to the network traverses through the same length of traces to be outputted to avoid spurious signal delays caused by different trace lengths.

Each beamformer cell of the plurality of beamformer cells 400 may include a beamformer 402, first filters 404, second filters 408, vias 406, vias 410, vias 411, 412, 413, 414, 415, 416, 417, 418, and electrically conductive traces between beamformer 402 and the vias 406, 410, 411-418. Beamformer cell 400 may be similar to beamformer cell 142i. Beamformer 402 may comprise an integrated circuit (IC) chip having a plurality of inputs and a plurality of outputs (e.g., chip pins). Continuing the example of eight H-networks, beamformer 402 may include eight inputs (denoted as $RF_{in}$) and eight outputs (denoted at $RF_{out}$). The eight inputs electrically couple to respective vias 411, 412, 413, 414, 415, 416, 417, 418. The eight outputs electrically couple to respective vias 406, 410. Disposed between each output and via 406/410 is the first or second filter 404, 408. For the eight outputs, four of the first filters 404 and four of the second filters 408 may be implemented. The vias electrically coupling to first filters 404 are denoted as vias 406, and vias electrically coupling to second filters 408 are denoted as vias 410.

In some embodiments, the inputs and outputs of beamformer 402 may be distributed on all sides of the beamformer 402. As illustrated in FIG. 4A, two opposing sides proximate to vias 411-418 may be configured with inputs and the remaining two opposing sides may be configured with outputs. As an example, without limitation, beamformer 402 size may be 20 millimeter (mm) by 20 mm and the H-network grid size may be 740 mm (which is the distance between the first and last nodes of the H-network in the horizontal or vertical direction).

First and second filters 404, 408 may comprise RF filters operating at or tuned to first (f1) and second frequencies (f2), respectively. First and second filters 404, 408 may be configured to filter RF signals to extract portions of RF signals at or around the first and second frequencies, respectively. First and second frequencies may be the frequencies associated with the particular antenna elements that electrically couple to particular outputs of the beamformer 402 using vias 406, 410. In some embodiments, first and second frequencies may be the same frequency, because all antenna elements that electrically couple to the beamformer 402 outputs may operate at the same frequency. In such implementation, first and second filters 404, 408 may be the same as each other.

In other embodiments, first and second frequencies may be different from each other, because first and second subsets of the plurality of antenna elements included in the antenna lattice may operate at first and second frequencies, respectively. And, in particular, antenna elements included in the first subset may electrically couple to vias 406 and antenna elements included in the second subset may electrically couple to vias 410. Hence, first and second filters 404, 408 may be different from each other. As an example, first and second subsets of antenna elements may comprise antenna elements configured in an interspersed arrangement, with first frequency ranging from approximately 11.95 to 12.2 Gigahertz (GHz) and second frequency ranging from approximately 10.95 to 11.2 GHz.

Vias 406, 410 may comprise electrically conductive vias that extend between layer 401 and particular antenna elements located in an antenna lattice layer. The lengths of vias 406, 410 may extend perpendicular to the major plane of layer 401, and in particular, in the negative z-direction (e.g., into the page) if implemented within a stack as configured in FIG. 1G. Vias 406 may electrically couple to particular antenna elements associated with the first frequency (see first filters 404 disposed in the output pathway to vias 406). Vias 410 may electrically couple to particular antenna elements associated with the second frequency (see second filters 408 disposed in the output pathway to vias 410). Vias 406, 410 may also be referred to as output vias, antenna vias, antenna element vias, antenna element connecting vias, or the like.

Vias 411-418 may comprise electrically conductive vias that extend between layer 401 and particular ends of traces of the last stage/level of the multiplex feed network 420. Each trace of the last stage/level comprises a trace segment between a last node at one end and the end of such trace at the other end. The end of the trace opposite the last node may be open or floating, and may be referred to as the termination or terminating end of the multiplex feed network. Such trace segments may also be referred to as termination, terminating, last, or end trace segments of the multiplex feed network. In FIG. 4A, ends of traces of the last stage/level of the multiplex feed network 420 comprise ends of traces that are vertical traces 424. Vias 411-418 may also be referred to as input vias.

Figure 4B:
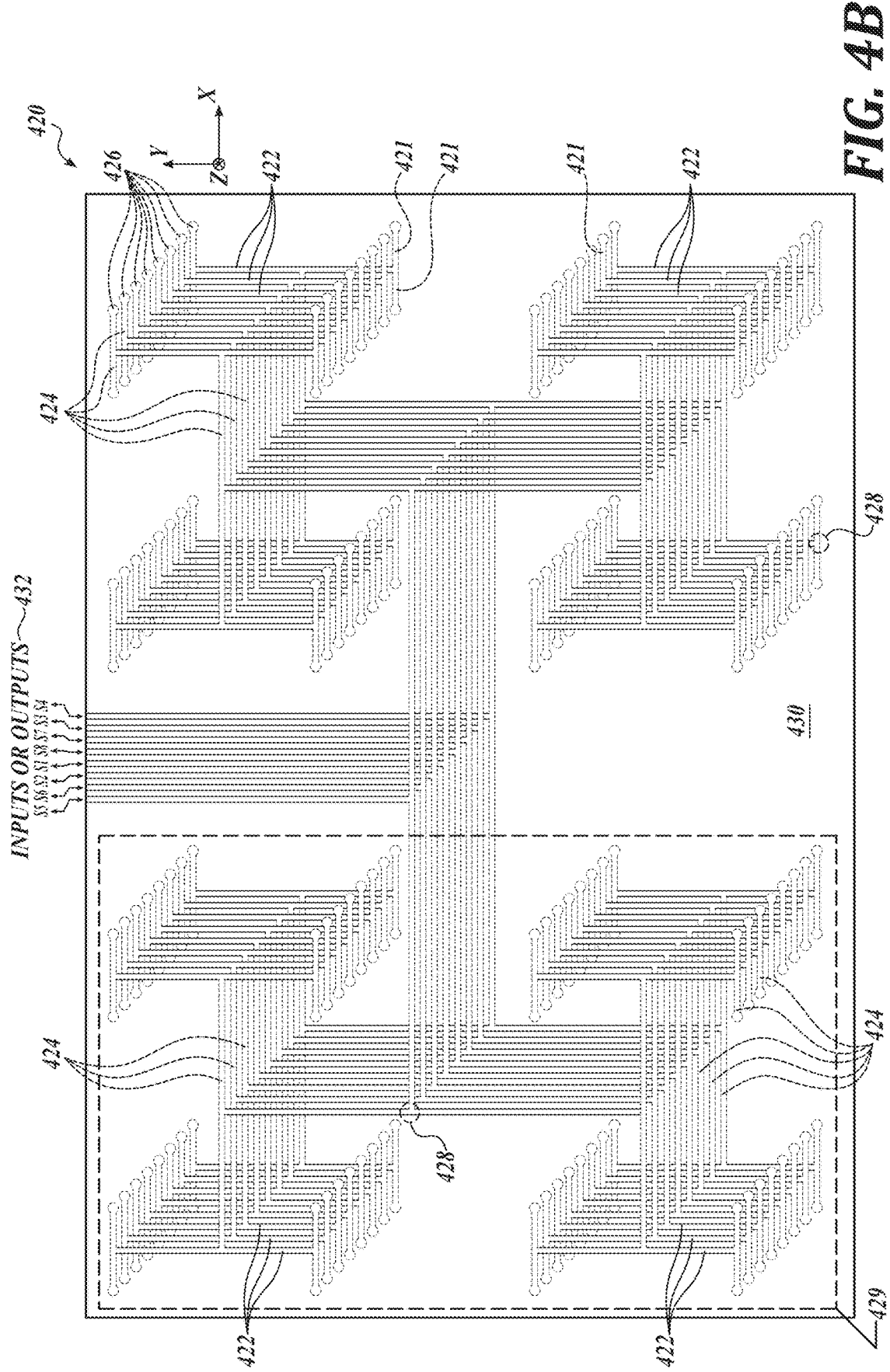
Figure 4C:
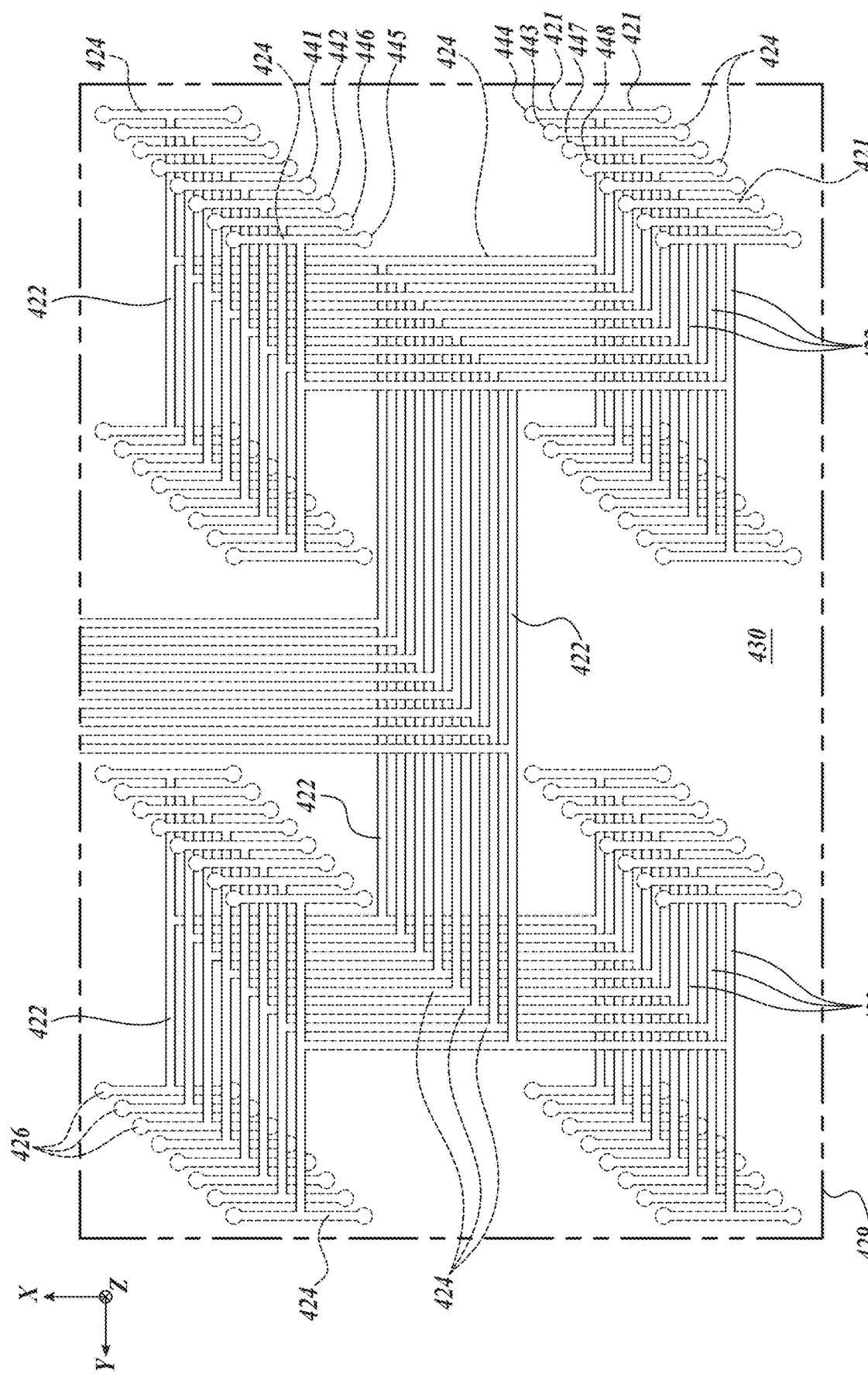

FIGS. 4B-4D depict additional views of the multiplex feed network 420 according to some embodiments of the present disclosure. FIGS. 4B-4C depict top views of two PCB layers overlaid over each other and in which the horizontal and vertical traces 422, 424 of the multiplex feed network 420 are included. In FIGS. 4B-4C, horizontal traces 422 are shown included in a PCB layer 430 (e.g., the upper layer of the two PCB layers) and the vertical traces 424 included in the PCB layer below the PCB layer 430 (e.g., the lower layer of the two PCB layers). Alternatively, vertical traces 424 may be included in the upper layer and horizontal traces 422 may be included in the lower layer.

FIG. 4B illustrates eight H-networks arranged next to each other and electrically isolated from each other. Each of the H-networks comprises a five stage/level H-network. Since the number of terminating ends of an H-network is $2^N$, for N=5 stages/levels, there are $2^5=32$ terminating ends for each of the eight H-networks. And a combined total of 32*8=256 terminating ends for the eight H-networks. Accordingly, termination or end trace segments 421 may extend from the last nodes (e.g., $5^{th}$ nodes) of each of the H-networks, and terminate or end at termination ends 426. In some embodiments, each of the termination ends 426 may include an end cap, pad, or other structure to facilitate electrical and/or physical coupling with a via, such as any of vias 411-418.

As will be discussed in detail below, although five stages/levels are shown, multiplex feed network 420 may comprise fewer or more than five stages/levels. Likewise, multiplex feed network 420 may comprise fewer or more than eight networks.

At each of the nodes 428, in which a horizontal trace 422 and a vertical trace 424 "intersect" each other from a top or bottom viewpoint of the two layers (as shown in FIG. 4B), a power splitter/combiner 432 as illustrated in FIG. 4D may be included. Power splitter/combiner 432 may comprise a first electrically conductive trace 434 included in a first layer, second and third electrically conductive traces 436, 437 included in a second layer disposed above or below the first layer, and first and second electrically conductive vias 438, 439. Power splitter/combiner 432 may comprise a three port structure, in which first, second, and third ports intersect with each other. A first port comprises a first portion of the first electrically conductive trace 434; a second port comprises a second portion of the first electrically conductive trace 434, second electrically conductive trace 436, and first electrically conductive via 438; and a third port comprises a third portion of the first electrically conductive trace 434, third electrically conductive trace 437, and second electrically conductive via 439.

In some embodiments, power splitter/combiner 432 may be configured to provide impedance matching among the three ports. Power splitter/combiner 432 may be configured to receive a signal in the first port and equally split or divide the received signal, and provide a split/divided signal to each of the second and third ports. Power splitter/combiner 432 may also be configured to receive respective signals in the second and third ports and to combine the received signals to provide the combined signal to the first port. Power splitter/combiner 432 may comprise a Wilkinson power splitter/combiner implemented in two layers.

In some embodiments, first electrically conductive trace 434 may comprise trace 422 and second and third electrically conductive traces 436, 437 may comprise trace 424. Conversely, first electrically conductive trace 434 may comprise trace 424 and second and third electrically conductive traces 436, 437 may comprise trace 422.

Returning to FIG. 4B, each network of the plurality of multiplex feed networks 420 may include an input or output 432. Input/output 432 may comprise an input when the multiplex feed networks 420 are configured in a receiver panel and an output when the multiplex feed networks 420 are configured in a transmitter panel. Each input/output 432 may be associated with a signal having particular parameters. For instance, without limitation, the respective signals may differ from each other in frequency. Each input/output 432 or corresponding signal may be associated with a different beam or channel. Hence, a phased antenna array system including eight H-networks may be capable of up to eight channel operation. Signals S5, S6, S2, S1, S8, S7, S3, S4 may be associated with respective inputs/outputs 432 from left to right in FIG. 4B.

FIG. 4C illustrates a portion 429 of the multiplex feed networks 420 of FIG. 4B according to some embodiments of the present disclosure. Termination ends 441-448, for example, may electrically couple to respective vias 411-418 shown in FIG. 4A. Termination ends 441-448 and termination ends 426, in general, may comprise the outputs/inputs of the multiplex feed networks 420. For example, if input/output 432 associated with signal S1 is configured as the input for the particular multiplex feed network associated with signal S1, then termination end 441 may be considered to be an output of the particular multiplex feed network, along with the remaining termination ends 426 of the particular multiplex feed network. Conversely, if input/output 432 associated with signal S1 is configured as the output for the particular multiplex feed network associated with signal S1, then termination end 441 may be considered to be an input of the particular multiplex feed network, along with the remaining termination ends 426 of the particular multiplex feed network.

The lengths of vias 411-418 may extend perpendicular to the major plane of layer 401, and in particular, in the negative z-direction (e.g., into the page) if implemented within a stack as configured in FIG. 1G. Termination ends 441-448 may be associated with signals S5, S6, S2, S1, S8, S7, S3, S4, respectively. In other words, signals S5, S6, S2, S1, S8, S7, S3, S4 may be carried by multiplex feed networks 5, 6, 2, 1, 8, 7, 3, 4, respectively. And the numbers shown inside vias 411-418 and other similar vias in FIG. 4A may correspond to the network designations enumerated above. Vias 411-418 may also be referred to as multiplex feed network vias, network vias, or the like. The diameters of vias 411-418, vias 406, and vias 410 may be the same or different from each other.

In some embodiments, a plurality of beamformer cells 400 may comprise the beamformer lattice. Beamformer cells 400 may be substantially arranged in a two-dimensional (2-D) array in layer 401. Although beamformer cells 400 located at the top and bottom of FIG. 4A are missing one or more structures included in beamformer cell 400 located at the middle of FIG. 4A (e.g., filters 404, 408, vias 406, 410, and associated traces), top and bottom beamformer cells 400 are the same as the middle beamformer cell 400. Some structures are not shown in the top and bottom beamformer cells 400 to ease illustration of features in FIG. 4A. Notice that beamformer cells 400 may align to "empty" spaces between termination ends 426, such as the middle beamformer cell 400, or "over" the traces 422, 424, such as the top or bottom beamformer cell 400.

Figure 5A:
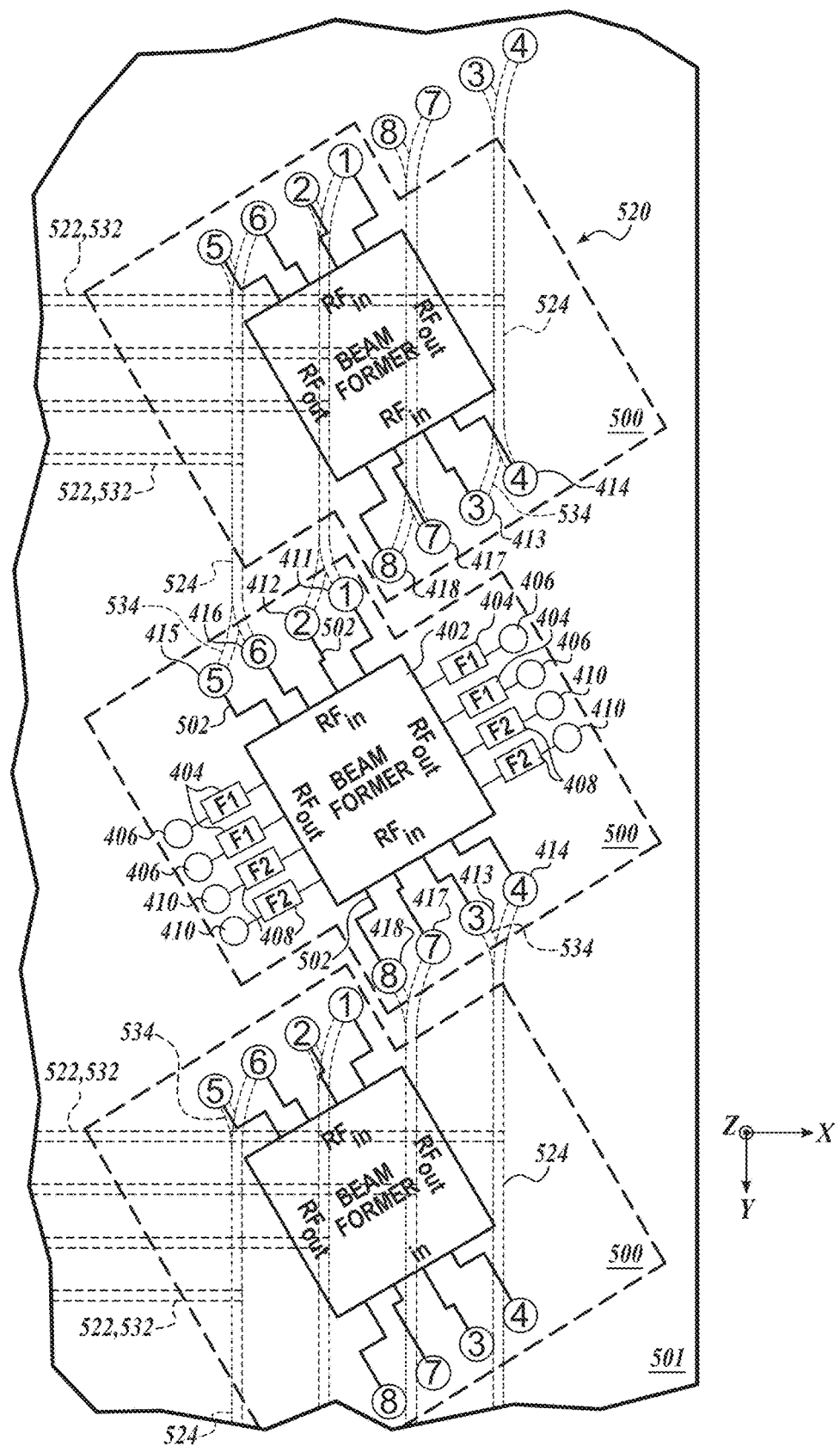
FIG. 5A depicts a block diagram of a portion of a stack including a beamformer lattice layer and four multiplex feed network layers according to alternative embodiments of the present disclosure.

FIG. 5A depicts a block diagram of a portion of a stack including a beamformer lattice layer and four multiplex feed network layers according to alternative embodiments of the present disclosure. The viewpoint of the layers relative to the stack illustrated in FIG. 5A may be the same as for FIG. 4A. In some embodiments, the configuration of the beamformer cells 500 with multiplex feed network 520 may be associated with a transmitter panel, embodiments in which the multiplex feed networks are configured within four PCB layers, embodiments in which the total number of multiplex feed networks cannot be implemented within two PCB layers due to spacing, manufacturing, or other constraints or design preferences, for a certain number of beamformers (e.g., more than 256 beamformers), and/or the like.

The beamformer lattice comprising a plurality of beamformer cells 500 may be implemented in a PCB layer 501. Each beamformer cell 500 may be similar to beamformer cell 400 of FIG. 4A. Beamformer cell 500 illustrates traces 502 between vias 411-418 and inputs of the beamformer 402 having a shape different from a straight line as shown in beamformer cell 400. Traces extending from the inputs and outputs of beamformer 402 to respective vias may be of any variety of shapes or contours, examples of which are illustrated in beamformer cells 400 and 500.

In contrast to the eight H-networks provided in two PCB layers in FIG. 4A, multiplex feed network 520 to which the beamformer cells 500 are electrically coupled may comprise eight H-networks configured in four PCB layers. Two sets of two-layer H-networks may be implemented, in which each set may include four H-networks for a total of eight H-networks within the two sets. Because fewer H-networks are provided in a given set of two PCB layers than in the layers of FIGS. 4A-4C, the pitch between the horizontal traces (also referred to as the y pitch or horizontal pitch) and/or the pitch between the vertical traces (also referred to as the x pitch or vertical pitch) may be greater than corresponding pitch(es) of traces in FIGS. 4A-4C. As an example, the y pitch may be approximately 3.1 mm and the x pitch may be approximately 6.3 mm.

FIG. 5B depicts a perspective view of a portion of the stack including the multiplex feed network 520 configured as eight H-networks according to some embodiments of the present disclosure. Multiplex feed network 520 may comprise a first subset 540 and a second subset 543, in which each of the first and second subsets 540, 543 may include a plurality of multiplex feed networks. For example, each of the first and second subsets 540, 543 may include four H-networks. First subset 540 may be disposed above the second subset 543. First subset 540 may include two PCB layers 541, 542 and second subset 543 may include two PCB layers 544, 545. Layer 542 may be disposed between layers 541 and 544, and layer 544 may be disposed between layers 542 and 545.

In the first subset 540, layer 541 may include vertical traces 524 of the four H-networks of the first subset 540 while layer 542 may include the horizontal traces 522 of the four H-networks of the first subset 540. The four H-networks of the first subset 540 may comprise H-networks in which signals S6, S1, S7, and S4 may be carried. The numbers denoted next to vertical traces 524 correspond to the numbers denoted to particular vias 411-418 as shown in FIG. 5A and specifies the particular trace to via coupling. For example, vertical trace 524 denoted with number "6" electrically couples to via 416, vertical trace 524 denoted with number "1" electrically couples to via 411, and so forth.

Similarly, layer 544 may include vertical traces 534 of the four H-networks of the second subset 543 while layer 545 may include the horizontal traces 532 of the four H-networks of the second subset 543. The four H-networks of the second subset 543 may comprise H-networks in which signals S5, S2, S8, and S3 may be carried. The numbers denoted next to vertical traces 534 correspond to the numbers denoted to particular vias 411-418 as shown in FIG. 5A and specifies the particular trace to via coupling. For example, vertical trace 534 denoted with number "8" electrically couples to via 418, vertical trace 534 denoted with number "3" electrically couples to via 413, and so forth. Moreover, first filters 404 or the first frequency associated with first filters 404 may be associated with signals S5, S2, S6, and S1, in which signals S5 and S2 may be carried by a different set of H-network layers than signals S6 and S1. Second filters 408 or the second frequency associated with second filters 408 may be associated with signals S8, S3, S7, and S4, in which signals S8 and S3 may be carried by a different set of H-network layers than signals S7 and S4.

Although not shown, one or more additional PCB layers, grounding planes, adhesive layers, electrical isolation layers, and/or other layers may be disposed above, within, or below the layers of multiplex feed network 520. The number of multiplex feed networks in the first and second subsets 540, 543 may be the same or different from each other.

In some embodiments, the orientation of the H-networks of the first and second subsets 540, 543 may be the same as each other so that traces are overlaid over each other except as discussed below. Hence, the traces of the first and second subsets 540, 543 may align and be collinear to each other in a direction perpendicular to the major plane of the stack (e.g., along the z-axis). For instance, FIGS. 5A-5B show horizontal traces 522 and 532 located directly over each other.

Vertical traces and nodes of the first and second subsets 540, 543 may also be collinear with each other except for the termination trace segments and termination ends of the first and second subsets 540, 543. If the termination ends of the first and second subsets 540, 543 are collinear with each other, then termination ends of the second subset 543 may not be accessible using vertical vias from layer 501 and/or electrically coupling with a termination end in the second subset 543 by a vertical via from layer 501 may also comprise electrically coupling with the termination end in the first subset 540 that is located between such vertical via and such termination end in the second subset 543.

Thus, in order for each of the vias 411-418 to electrically couple with a particular one of the termination ends in the first or second subsets 540, 543 (e.g., alternating between a termination end in the first and second subsets 540, 543 for adjacent vias), corresponding termination ends in the first and second subsets 540, 543 may be configured to be offset or non-collinear from each other in a direction perpendicular to the major plane of layer 501.

Vertical traces 524, 534 shown in FIG. 5B may comprise the traces at the termination ends. From left to right, adjacent termination ends in the first and second subsets 540, 543 are displaced or spaced apart from each other along the x-direction and also alternate between being located in the first subset 540 or the second subset 543 (along the z-axis). In order for corresponding termination ends of the first and second subsets 540, 543 to be offset from each other, the termination trace segments associated with the corresponding termination ends may be configured to prescribe different trace pathways or have different shapes from each other. The corresponding termination trace segments, and all termination trace segments of the multiplex feed networks 520, in general, may still have the same trace lengths so that the signal pathway length associated with each multiplex feed network of the plurality of multiplex feed networks 520 from the input/output to the output/input will be length matched to each other. For example, termination ends to electrically couple with respective vias 415 and 416 may be offset from each other and termination trace segments associated with such termination ends may prescribe a different trace path from each other to locate such termination ends at non-collinear locations, even though the remaining traces of the two H-networks associated with such termination ends may be collinear to each other.

Figure 5C:
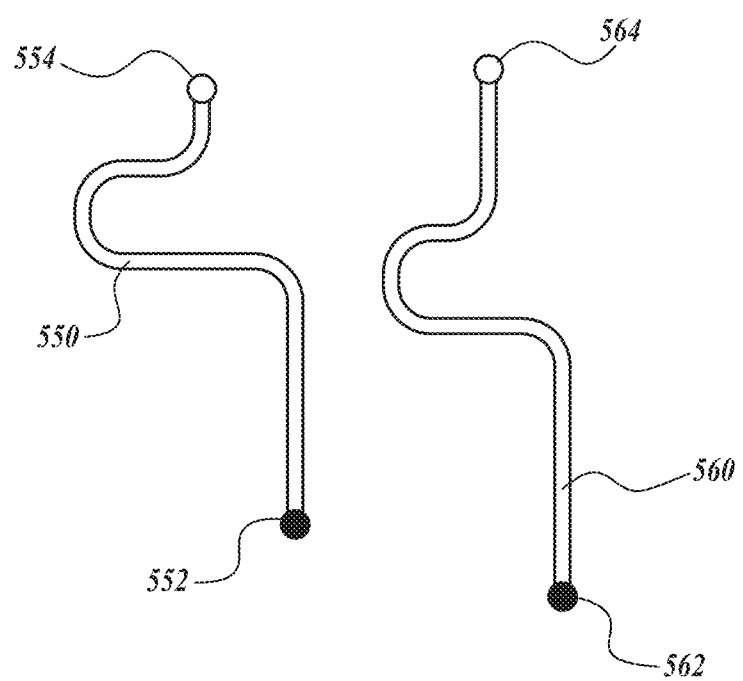
FIGS. 5C-5D depict example shapes or contours of termination trace segments included in the multiplex feed network according to some embodiments of the present disclosure.
Figure 5D:
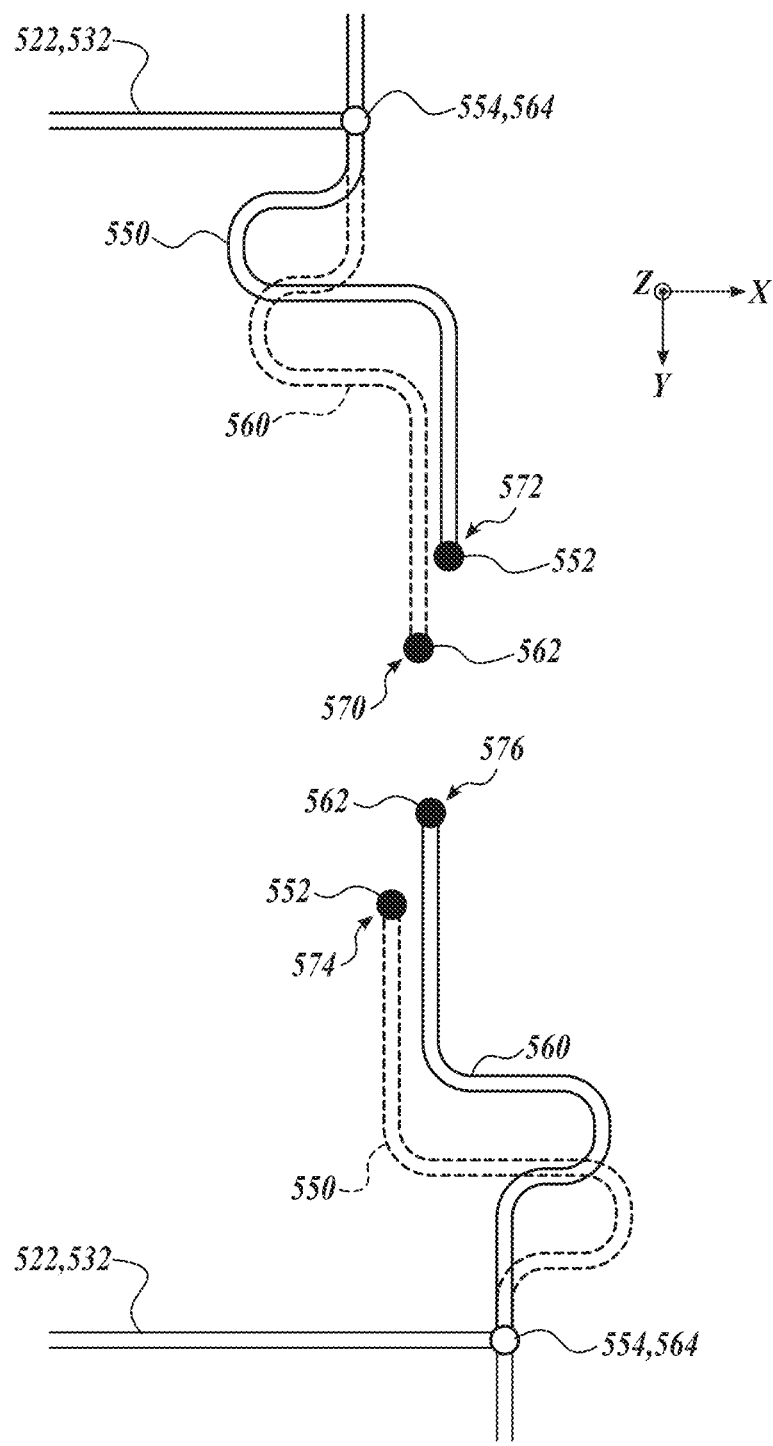

FIGS. 5C-5D depict example shapes or contours of termination trace segments 550, 560 included in the multiplex feed networks 520 according to some embodiments of the present disclosure. In some embodiments, one end of a termination trace segment 550 may comprise a termination end 552 and the opposite end of the termination trace segment 550 may comprise a last or end node 554 of the multiplex feed network in which the termination trace segment 550 is included. One end of a termination trace segment 560 may comprise a termination end 562 and the opposite end of the termination trace segment 560 may comprise a last or end node 564 of the multiplex feed network in which the termination trace segment 560 is included.

Termination trace segment 550 may have a shape or contours different from termination trace segment 560. Each of the termination trace segments 550, 560 may include one or more straight segments, one or more curved segments, one or more angled segments, and/or the like. Because the termination trace segments 550, 560 may have a shape other than a straight line (all of the non-termination trace segments having a straight line shape), termination trace segments 550, 560 may also be referred to as meandering traces or traces having meandering shape, contours, or the like.

Termination trace segments 550, 560 may be configured in accordance with contour, manufacturing, location, and/or the like requirements or constraints. As an example, the signal pathway (also referred to as the electrical path or pathway) lengths of termination trace segments 550, 560 are to be equal to each other or within a certain tolerance range, such as 1.55 mm. As another example, if the (line) width of termination trace segments 550, 560 is 0.2 mm, then a minimum radius of curvature (ROC) of any curves included in the termination trace segments 550, 560 is to be at least 0.5 mm. As still another example, locations of termination trace segments 550, 560 may be configured so that vias, such as vias 406 and/or 410 associated with beamformer cells 500, may extend through the multiplex feed network layers to particular antenna elements located in the antenna lattice layer.

FIG. 5D depicts an example arrangement of termination trace segments 550, 560 from the same viewpoint as in FIG.

5A except with layer 501 omitted, according to some embodiments of the present disclosure. In the upper group of termination trace segments, termination trace segment 560 may comprise a trace included in the second subset 543 and may be disposed below termination trace segment 550 included in the first set 540. In the lower group of termination trace segments, termination trace segment 550 may comprise a trace included in the second subset 543 and may be disposed below termination trace segment 560 included in the first set 540. In this manner, termination ends 562, 552 may be offset from each other and also located (e.g., located along a diagonal line) to align with particular of vias 411-418. For instance, termination ends 570, 572 may electrically couple to vias 415, 416, respectively, and termination ends 574, 576 may electrically couple to vias 418, 417, respectively. As another example, termination ends 570, 572 may electrically couple to vias 412, 411, respectively, and termination ends 574, 576 may electrically couple to vias 413, 414, respectively.

Figure 6A:
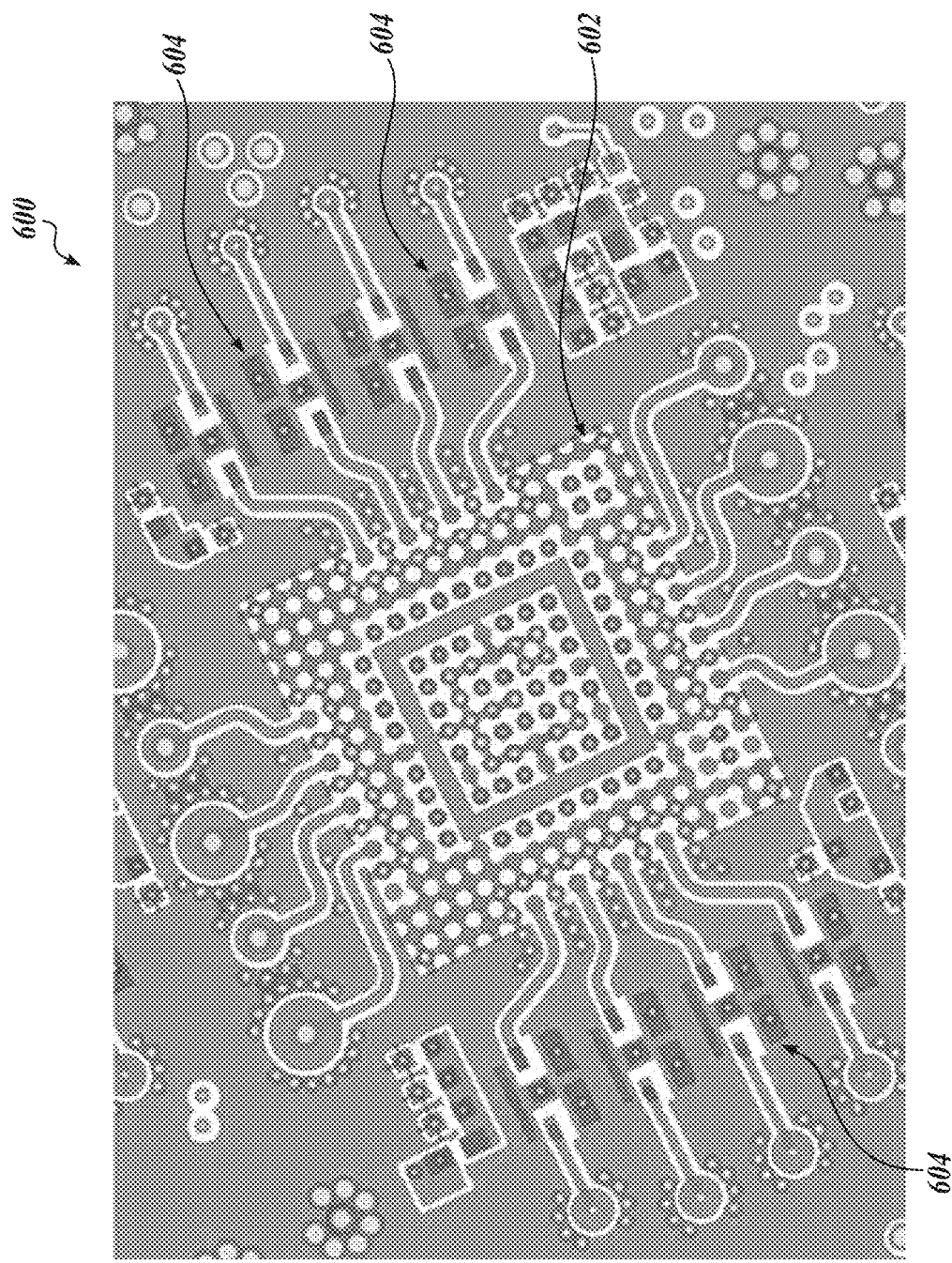
FIGS. 6A-6B depict examples of portions of a PCB layer in which a beamformer cell may be located according to some embodiments of the present disclosure.
Figure 6B:
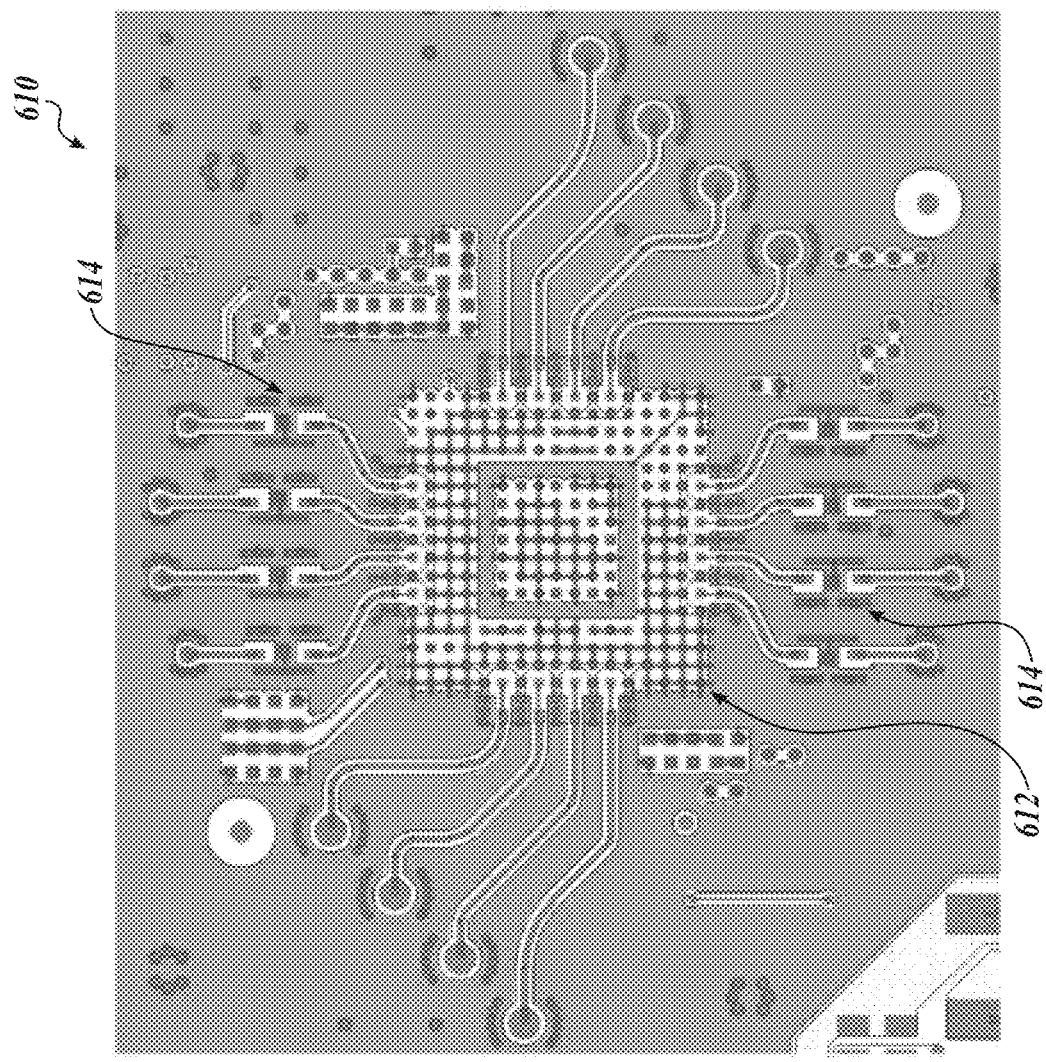

FIGS. 6A-6B depict examples of portions of a PCB layer in which a beamformer cell may be located according to some embodiments of the present disclosure. Portion 600 shown in FIG. 6A may comprise an area in which a beamformer cell, such as beamformer cell 400 or 500, may be located. A plurality of traces and at least the ends of vias included in a beamformer cell are shown. A landing pad 602 is where a beamformer chip (e.g., beamformer 402) may be mounted, and landing pads 604 are where filter chips (e.g., first or second filters 404, 408) may be mounted. Portion 610 shown in FIG. 6B may be similar to portion 600 including landing pads 612, 614 that are similar to landing pads 602, 604, respectively, except the beamformer chip and by extension, the beamformer cell, are oriented at a different angle from the orientation shown in FIG. 6A.

The beamformer orientation in FIG. 6A may be referred to as an angled or rotated orientation and the beamformer orientation in FIG. 6B may be referred to a straight or aligned orientation. In some embodiments, beamformers may be configured in an angled/rotated orientation in order to fit beamformers relative to the multiplex feed networks where a straight/aligned orientation may not fit due to insufficient space. Whether arranged in a straight/aligned or angled/rotated orientation, all beamformers included in a given beamformer lattice may be arranged in the same orientation.

Beamformer Lattice Arrangement

Figure 7:
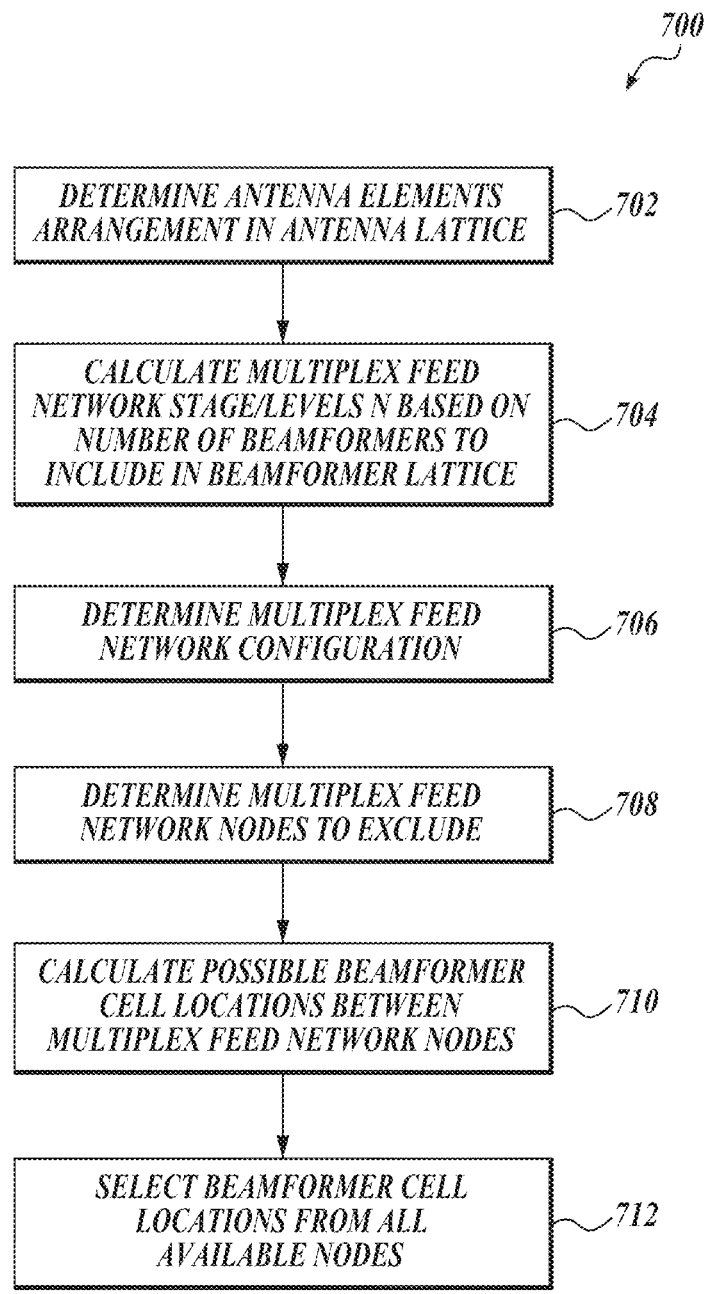
FIG. 7 depicts a process for determination of an example beamformer lattice arrangement or layout according to some embodiments of the present disclosure.

FIG. 7 depicts a process 700 for determination of an example beamformer lattice arrangement or layout according to some embodiments of the present disclosure. Process 700 may comprise a technique or scheme to determine a particular arrangement of the plurality of beamformer cells 400 or 500 in a beamformer lattice layer relative to the multiplex feed network 420 or 520.

At block 702, a particular antenna elements arrangement in an antenna lattice may be determined. In some embodiments, without limitation, the type of arrangement (e.g., space taper, interspersed, etc.) and the particular location of each antenna element within the antenna lattice may be determined. The particular antenna elements arrangement may be determined based on parameters such as, but not limited to, desired radiation pattern or shape, type(s) of antenna elements to be included in the antenna lattice, desired antenna aperture, manufacturing constraints, panel size (e.g., panel diameter or width), and/or the like.

With the location of each antenna element included in the antenna lattice known as well as the operating characteristics associated with each antenna element (e.g., operating frequency), process 700 may proceed to block 704, in which the number of stages/levels N of the multiplex feed network required based on the number of beamformers to include in the beamformer lattice may be calculated. In some embodiments, a design parameter of a panel (e.g., a receiver or transmitter panel) may include having one beamformer drive/feed a plurality of antenna elements. For example, one beamformer may be configured to drive/feed eight antenna elements. Accordingly, with the total number of antenna elements included in the antenna lattice known at block 702, the minimum number of beamformers required is also known (e.g., total number of antenna elements/8).

In the case of the multiplex feed network comprising H-networks, the number of nodes (also referred to as power splitter/combiner nodes) of a H-network is a function of the number of stages/levels of the H-network. In particular, the number of nodes equals 2N, where N is the number of stages/levels of the H-network. In some embodiments, the number of nodes is selected to be larger than the number of beamformers to be included in the beamformer lattice. For number of beamformers larger than 256, the number of stages/levels is N=9 (e.g., $2^9$=512 nodes>256 beamformers).

Each input of a beamformer may be configured to electrically couple to a particular termination end of a respective H-network of the plurality of H-networks. For a beamformer configured with eight inputs, eight H-networks may be implemented. Accordingly, at block 706, the particular implementation configuration of eight H-networks is determined.

It is understood that the number of inputs and outputs of the beamformer may be the same or different from each other. For instance, a beamformer configured to couple to eight antenna elements may have less or more than eight inputs. Each beamformer input may or may not couple to a different multiplex feed network from each other. For instance, a beamformer including eight inputs may collectively couple to six multiplex feed networks, rather than eight multiplex feed networks.

Based on the number of stages/levels N calculated in block 704, the number of electrically conductive traces of the H-networks may be calculated (e.g., greater the number of stages/levels, the greater the number of traces or trace segments). H-network traces may also be referred to as Manhattan lines. Additional design requirements of a receiver or transmitter panel may include, without limitation, a fixed panel size (e.g., panel diameter or width), diameter of vias to electrically couple with H-network termination ends (e.g., vias 411-418), width of H-network traces, and/or the like.

The overall size of more than one Nth stage/level H-networks arranged adjacent to each other, such as shown in multiplex feed networks 420, 520, may depend on the spacing or pitch between adjacent H-networks and, in particular, the x pitch and y pitch associated with the horizontal and vertical traces of the adjacent H-networks, and/or the number of adjacent H-networks located within the same plane. However, because the receiver or transmitter panel in which the H-networks are included is of a fixed size, the H-networks to be included in the same panel may also be constrained to not exceed the panel size.

In some embodiments, block 706 may comprise determination/calculation of: (1) whether to fit all of the H-networks (e.g., eight H-networks) in two layers, such as multiplex feed network 420, or in four layers, such as multiplex feed network 520, (2) if the H-networks are to be configured in four layers, the allocation of the H-networks between the first and second sets of two layers (e.g., 4:4 distribution, 3:5 distribution, etc.), (3) the horizontal and/or vertical pitches of the H-network traces, other parameters associated with arrangement of the H-networks to properly interface with the beamformer lattice layer, and/or the like. In some embodiments, at least the vertical pitch value may be selected based on the diameter of via that electrically couples termination ends to ends of traces extending from beamformer inputs.

FIGS. 8A-8B depict example simplified top views of eight and four H-networks, respectively, arranged in two layers according to some embodiments of the present disclosure. In FIG. 8A, eight H-networks are arranged in two layers (also referred to as having eight Manhattan lines in a single sub-lamination), in which a horizontal pitch 806 associated with horizontal traces 800 and a vertical pitch 808 associated with vertical traces 802 may be smaller than corresponding pitches in FIG. 8B. Termination ends may be located at ends of vertical traces 802 with vias 804 configured to electrically couple between the termination ends and traces extending from the beamformer inputs. Vias 804 may comprise examples of vias 411-418. Vias 804 may also be referred to as mapping vias, coaxial vias, or the like.

However, due to the small pitches 806 and/or 808, there is insufficient space to locate all of the vias 804 at respective termination ends without overlapping with each other. Overlapping vias may result in electrical coupling between the vias, which is not acceptable. As an example, diameter of via 804 may be in the range of 3.25 mm and pitches 806 and/or 808 may be approximately 1.5 mm.

By contrast, in FIG. 8B, eight H-networks may be arranged in four layers (also referred to as eight Manhattan lines in two sub-laminations) with four H-networks arranged in a set of two layers of the total four layers. With fewer number of H-networks and traces arranged in the same amount of planar area, compared to eight H-networks illustrated in FIG. 8A, horizontal and vertical pitches 816, 818 are larger than respective horizontal and vertical pitches 806, 808. Moreover, the vertical pitch 818 is large enough for vias 804 to be located without overlapping with each other. Vertical pitch 818 may be larger than the diameter of via 804. Accordingly, arranging the H-networks in four layers, and moreover, arranging half of the total number of H-networks in each set of two layers, may be selected.

Figure 8C:
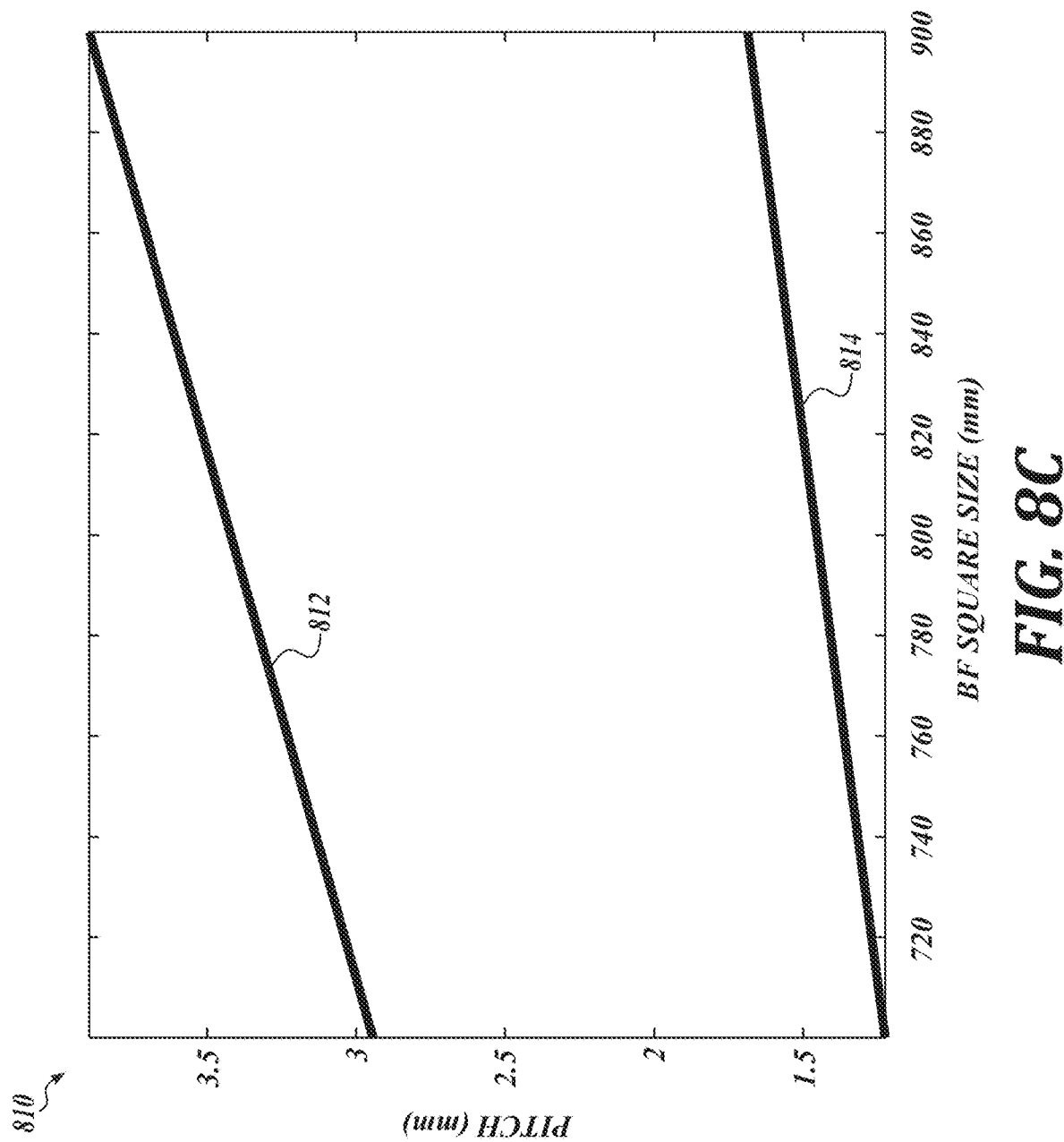
FIG. 8C depicts a graph showing relationships between (vertical) pitch of H-networks and beamformer square size, according to some embodiments of the present disclosure.

FIG. 8C depicts a graph 810 showing relationships between (vertical) pitch of H-networks and beamformer square size, according to some embodiments of the present disclosure. Beamformer square size may be similar to H-network overall size. In graph 810, eight H-networks may be arranged in two layers. Line 812 may associate with an eight stage/level H-network and line 814 may associate with a nine stage/level H-network. As shown in graph 810, the pitch is larger at every value of beamformer size for the eight stage/level H-network (e.g., line 812) compared to the nine stage/level H-network (e.g., line 814). With fewer stages/levels, there are fewer number of nodes and associated traces, and thus, the space, distance, or pitch between traces is larger.

If four H-networks are arranged in the two layers, the relationship between H-network pitch and beamformer square size may be similar to line 814. Because of this, two sets of four H-networks arranged in a total of four layers may be used in cases where such H-networks are nine stages/levels.

Figure 9A:
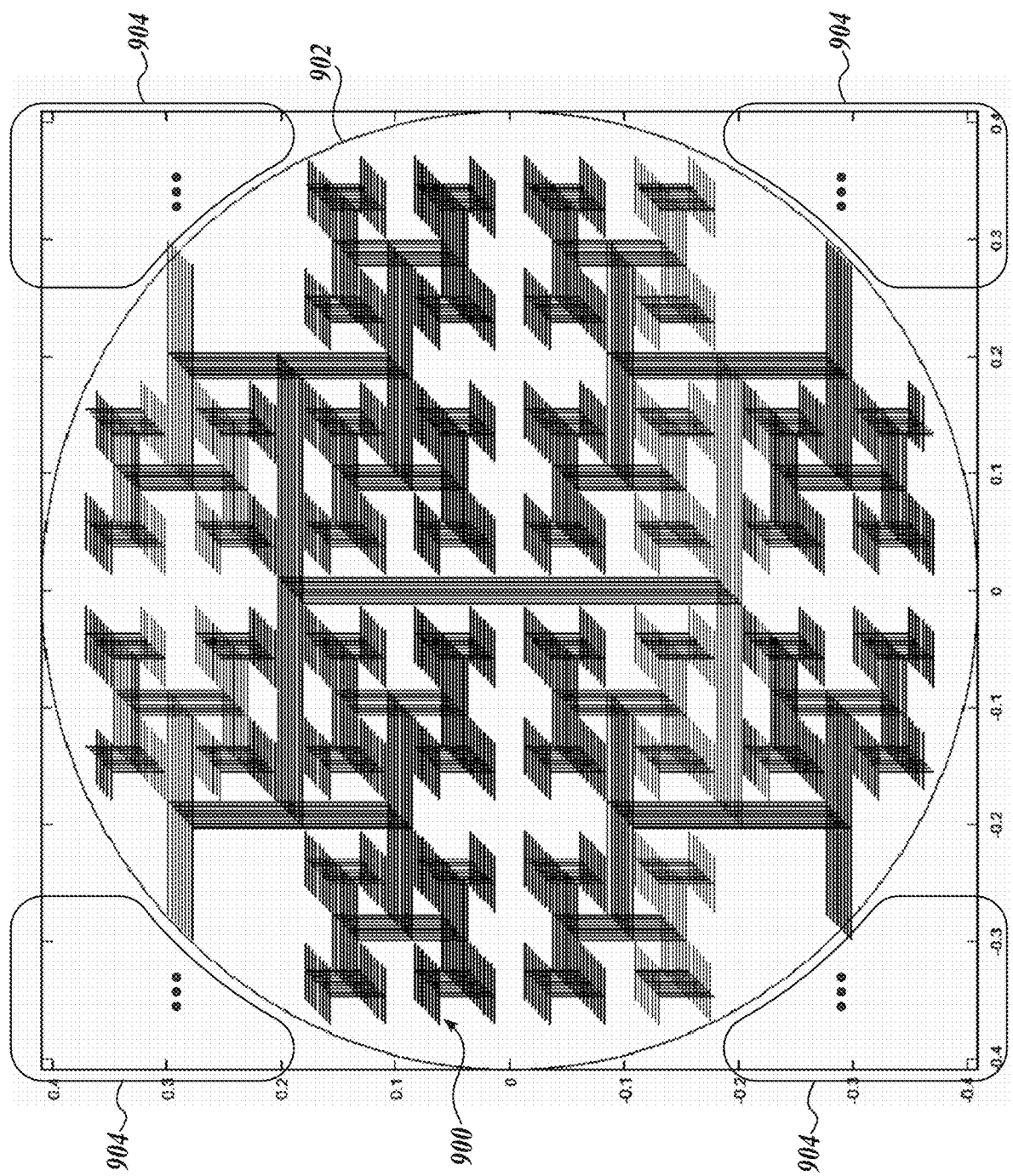
FIG. 9A depicts eight H-networks arranged in a square area with exclusion areas shown, according to some embodiments of the present disclosure.

Next, at block 708, a determination is made as to which nodes of the multiplex feed network to exclude based on node locations relative to the panel. In some embodiments, H-network nodes that are located outside the panel area may be excluded as sites for coupling with beamformers. As an example, FIG. 9A depicts eight H-networks 900 arranged in a square area. A receiver or transmitter panel may have a circular area 902. If the area of the H-networks 900 is larger than the diameter of the circular area 902 (e.g., a width or length of the area of the H-networks 900 is larger than the diameter of the circular area 902), then H-network nodes and traces located outside the circular area 902 may be deemed excluded. Although not shown to ease illustration, excluded areas 904 denoted in FIG. 9A include nodes and traces of the H-networks 900 that extend to the corners of the H-network area. Traces in the excluded areas 904 may be electrically grounded or terminated. In FIG. 9A, width of the H-network square area and the panel diameter of the circular area 902 may be 0.72 meter (m) and the pitch associated with H-networks 900 may be 3 mm.

At block 710, possible beamformer cell locations between the H-network nodes may be calculated. Blocks 708 and 710 may comprise identification of all the possible locations relative to the H-networks at which beamformer cells may be located. In some embodiments, if the termination trace segments (the traces of the last stage/level of the H-networks) have horizontal orientation/direction, then beamformers may be located horizontally offset from the horizontally oriented termination trace segments. If the termination trace segments have vertical orientation/direction, then beamformers may be located vertically offset from the vertical oriented termination trace segments.

Figure 9B:
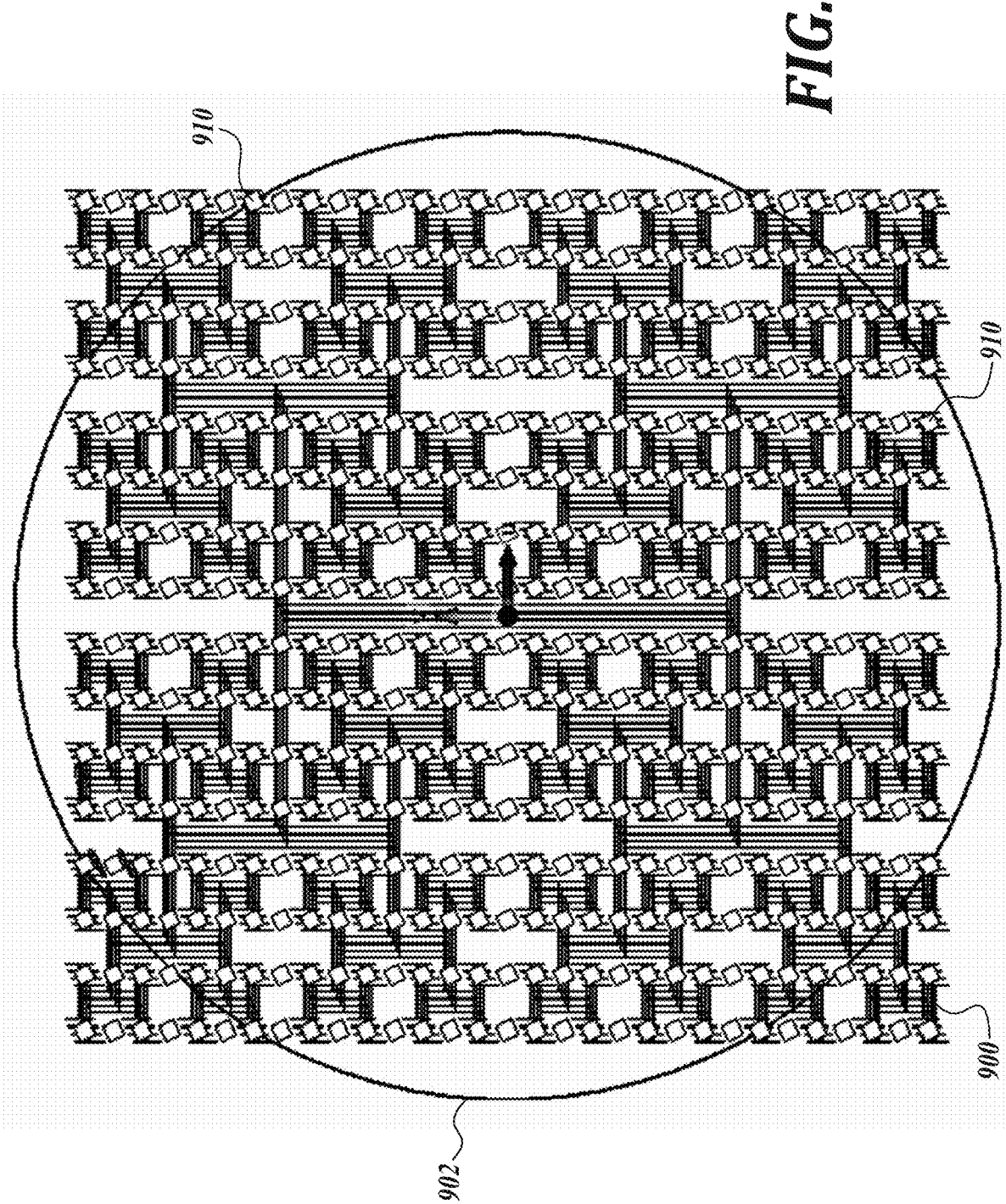
FIG. 9B depicts identification of possible beamformer cell locations relative to H-networks, according to some embodiments of the present disclosure.

In some embodiments, possible beamformer cell locations between the H-network nodes may comprise all the locations where a beamformer 910 is shown within the circular area 902 of the panel in FIG. 9B. In FIG. 9B, portions of the H-networks 900 extending outside the circular area 902 are shown (e.g., those included in excluded areas 904 of FIG. 9A) and which may be located beamformers but for the exclusion discussed above for block 708.

Figure 10:
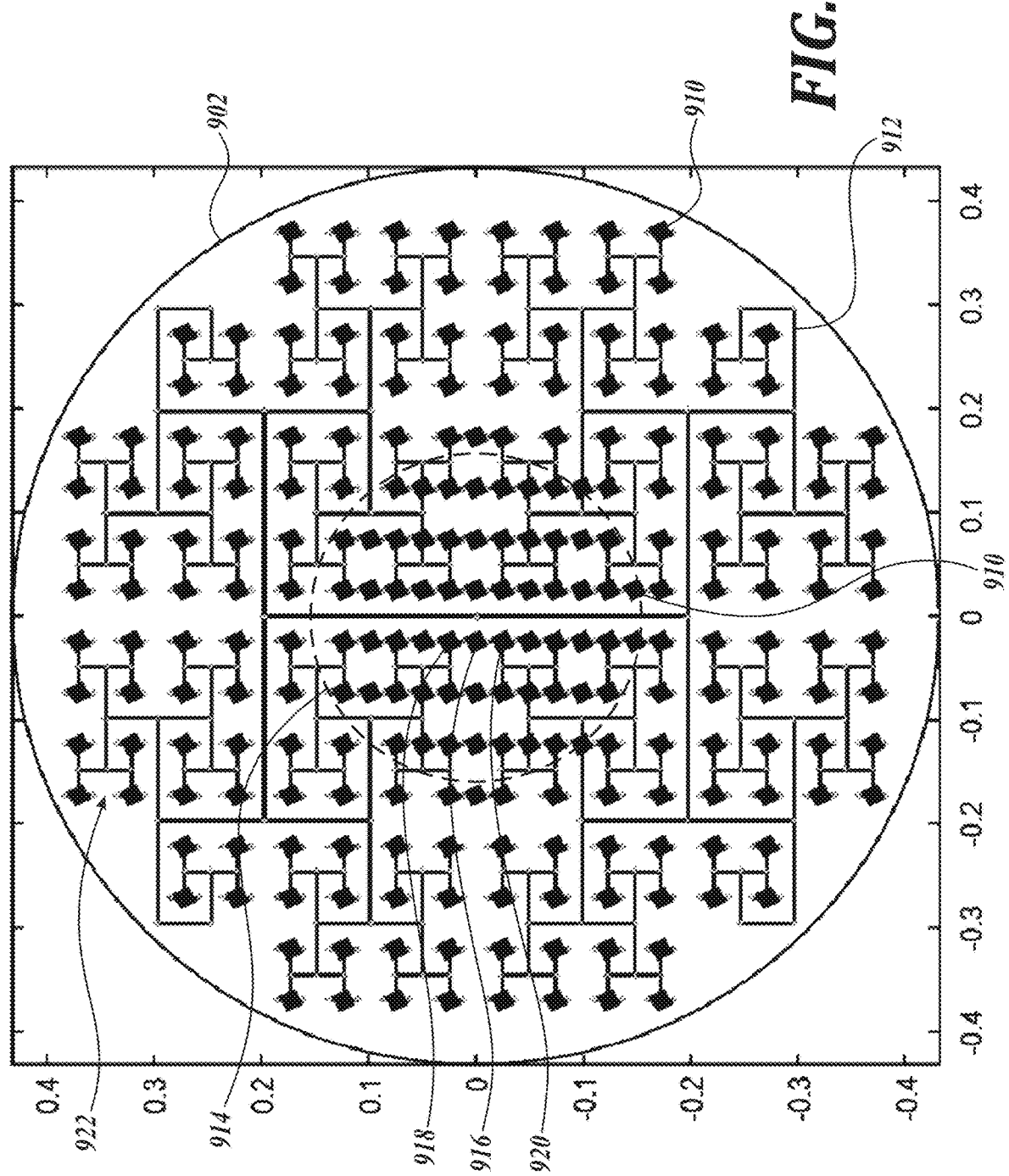
FIG. 10 depicts an example of beamformer cells arrangement relative to a single H-network, according to some embodiments of the present disclosure.

Last, at block 712, particular beamformer cell locations may be selected from among the possible beamformer cell locations identified in blocks 708 and 710 based on density of antenna elements in the antenna lattice. The number of possible beamformer cell locations may be greater than the number of beamformer cells comprising the beamformer lattice. FIG. 10 depicts an example of beamformer cells arrangement relative to a single H-network 912, according to some embodiments of the present disclosure. H-network 912 may comprise one of the H-networks of the plurality of H-networks 900. A single H-network 912, as opposed to four, eight, or all of the H-networks, is shown for purposes of easing illustration of the beamformer cells.

In some embodiments, the density of beamformer cells 910 in a center portion 914 of the beamformer lattice may be greater than the density of beamformer cells 910 outside the center portion 914. As shown in FIG. 10, within the center portion 914, a beamformer cell 910 may be located at each of the possible beamformer cell locations: at a location 916 between groups of termination ends (a location similar to where the middle beamformer cell 400 is positioned in FIG. 4A), at a location 918 "over" a set of last nodes (a location similar to where the top beamformer cell 400 is positioned in FIG. 4A), and at a location 920 "over" another set of last nodes (a location similar to where the bottom beamformer cell 400 is positioned in FIG. 4A). Outside the center portion 914, beamformer cells 910 may be located at locations similar to locations 918 and 920 but not at locations similar to location 916, such as at location 922.

The higher density of beamformer cells 910 in the center portion 914 may correspond to the higher density of antenna elements in the center portion of the antenna lattice relative to the antenna element density in the periphery of the antenna lattice (e.g., antenna elements in a space taper arrangement). In order to reduce signal pathway length between a beamformer and its associated antenna elements, in which such signal pathway length may include lengths associated with traces provided on one or more layers between the beamformer lattice layer and the antenna lattice layer as well as one or more vias extending between layer(s) between the beamformer lattice layer and the antenna lattice layer (which collectively may be referred to as a mapping length or mapping trace length), each beamformer cell 910 may be located proximate to or as close as possible to its associated antenna elements. Each beamformer cell 910 may be aligned at the same (or substantially the same) location on the x-y plane of the beamformer lattice layer as the locations of associated antenna elements on the x-y plane of the antenna lattice. For example, a beamformer cell 910 may not be located on opposite sides of the panel from its associated antenna elements because the mapping length would be unnecessarily long.

In some embodiments, Hungarian mapping algorithm may be used to identify mapping between beamformers to antenna elements which result in the smallest mapping length.

In some embodiments, blocks 704-712 may be performed iteratively a plurality of times for a plurality of different H-network (square) sizes, different numbers of beamformers, one or more other parameters, and/or the like. In some embodiments, the configuration that provides the smallest mapping length may be selected. In alternative embodiments, a configuration that provides one or more other advantages, even if not a configuration that provides the smallest mapping length, may be selected as the final beamformer lattice and H-network arrangements.

For instance, in the table below, parameters associated with five different iterations of blocks 704-712 are shown. The minimum number of beamformers required may be 173 in these iterations.

|  | Iteration 1 | Iteration 2 | Iteration 3 | Iteration 4 | Iteration 5 |
|---|---|---|---|---|---|
| H-network square size X (m) | 0.67 | 0.68 | 0.69 | 0.69 | 0.7 |
| H-network square size Y (m) | 0.67 | 0.68 | 0.69 | 0.69 | 0.7 |
| Mapping length (mm) | 85 | 92.2 | 95 | 118 | >118 |
| Number of beamformers | 173 | 176 | 178 | 173 | 173 |

The configuration of Iteration 1 results in the smallest mapping length from among Iterations 1-5. Nevertheless, the configuration of Iteration 4 may be selected because, although the mapping length is among the longest, Iteration 4 provides the advantages of using a minimal number of beamformers (e.g., fewer components, lower cost, lower weight) and a larger H-network square size. Larger H-network square size permits larger pitch size at the expense of a larger mapping length. A larger pitch size may be achieved, in some embodiments, by configuring the H-networks in four layers rather than within two layers.

Illustrative examples of the apparatuses, systems, and methods of various embodiments disclosed herein are provided below. An embodiment of the apparatus, system, or method may include any one or more, and any combination of, the examples described below.

Example 1 is an apparatus, which includes:

a beamformer including a plurality of inputs and a plurality of outputs;

a plurality of input vias, wherein each input of the plurality of inputs electrically couples to a respective input via of the plurality of input vias; and a plurality of output vias, wherein each output of the plurality of outputs electrically couples to a respective output via of the plurality of output vias;

wherein the beamformer is included in a first layer, wherein the plurality of input vias are configured to electrically couple to termination trace ends of a plurality of hierarchical networks provided on at least second and third layers, and wherein the plurality of hierarchical networks comprises at least three hierarchical networks.

Example 2 includes the subject matter of Example 1, and further comprises a plurality of radio frequency (RF) filters included in the first layer, wherein each RF filter of the plurality of RF filters is disposed between and electrically couples to a respective output of the plurality of outputs and a respective output via of the plurality of output vias.

Example 3 includes the subject matter of any of Examples 1-2, and wherein the plurality of output vias is configured to electrically couple each pair of RF filter and output to an antenna element of a plurality of antenna elements provided on a fourth layer.

Example 4 includes the subject matter of any of Examples 1-3, and wherein the second and third layers are disposed between the first and fourth layers.

Example 5 includes the subject matter of any of Examples 1-4, and wherein a location of the beamformer in the first layer is configured to reduce a signal pathway length to the antenna elements electrically coupled to the plurality of output vias.

Example 6 includes the subject matter of any of Examples 1-5, and wherein each RF filter of the plurality of RF filters is configured to filter signals at a frequency in accordance with an operating frequency associated with the respective antenna element.

Example 7 includes the subject matter of any of Examples 1-6, and wherein each RF filter of a first subset of the plurality of RF filters is associated with a first frequency and each RF filter of a second subset of the plurality of RF filters is associated with a second frequency.

Example 8 includes the subject matter of any of Examples 1-7, and wherein the first frequency is the same as the second frequency.

Example 9 includes the subject matter of any of Examples 1-8, and wherein the first frequency is different from the second frequency.

Example 10 includes the subject matter of any of Examples 1-9, and wherein each RF filter of the first subset is configured to filter out signal portions not at the first frequency and each RF filter of the second subset is configured to filter out signal portions not at the second frequency.

Example 11 includes the subject matter of any of Examples 1-10, and wherein a first subset of the plurality of hierarchical networks are provided in the second and third layers and a second subset of the plurality of hierarchical networks are provided in fifth and sixth layers.

Example 12 includes the subject matter of any of Examples 1-11, and wherein a first subset of the termination trace ends electrically coupled to the input vias are included in the first subset of the plurality of hierarchical networks and a second subset of the termination trace ends electrically coupled to the input vias are included in the second subset of the plurality of hierarchical networks.

Example 13 includes the subject matter of any of Examples 1-12, and wherein the plurality of hierarchical networks comprises H-networks.

Example 14 includes the subject matter of any of Examples 1-13, and wherein electrically conductive traces in a first orientation included in the plurality of hierarchical networks are located in the second layer and electrically conductive traces in a second orientation, different from the first orientation, included in the plurality hierarchical networks are located in the third layer.

Example 15 includes the subject matter of any of Examples 1-14, and wherein the beamformer includes a plurality of phase shifters and comprises an integrated circuit (IC) chip.

Example 16 includes the subject matter of any of Examples 1-15, and wherein the plurality of inputs and the plurality of outputs are distributed on all sides of the IC chip.

Example 17 includes the subject matter of any of Examples 1-16, and wherein the beamformer electrically couples with up to eight antenna elements.

Example 18 includes the subject matter of any of Examples 1-17, and further comprising a plurality of antenna elements included in a fourth layer and electrically coupled to the plurality of output vias, wherein an antenna element of the plurality of antenna elements is included in an antenna module, the antenna module further including an amplifier electrically coupled with the antenna element.

Example 19 includes the subject matter of any of Examples 1-18, and wherein the antenna module is included in the third layer.

Example 20 includes the subject matter of any of Examples 1-19, and wherein the first, second, and third layers comprise discrete printed circuit board (PCB) layers in a PCB stack.

Example 21 includes the subject matter of any of Examples 1-20, and wherein one or more of the first, second, and third layers comprises a substrate, a printed circuit board (PCB), a ceramic board, or a sub-layer of a layer.

Example 22 includes the subject matter of any of Examples 1-21, and wherein the plurality of output vias electrically couples with a plurality of antenna elements included in a fourth layer, and wherein an electrical signal pathway length between each pair of the output and the antenna element is equidistant to each other.

Example 23 includes the subject matter of any of Examples 1-22, and wherein the plurality of output vias electrically couples with a plurality of antenna elements included in a fourth layer, and wherein a number of output vias of the plurality of output vias is greater than a number of antenna elements of the plurality of antenna elements.

Example 24 is an apparatus, which includes:
a plurality of beamformer cells arranged in a particular arrangement in a first layer, wherein each beamformer cell of the plurality of beamformer cells comprises:
a beamformer including a plurality of inputs and a plurality of outputs,
a plurality of input vias having first and second ends, wherein each first end of an input via of the plurality of input vias electrically couples to a respective input of the plurality of inputs and each second end of the input via of the plurality of input vias electrically couples to a terminating trace segment of a multiplex feed network located in a second layer, and
a plurality of output vias having third and fourth ends, wherein each third end of an output via of the plurality of output vias electrically couples to a respective output of the plurality of outputs and each fourth end of the output via of the plurality of output vias electrically couples to an antenna element of a plurality of antenna elements located in a third layer,
wherein each beamformer cell of the plurality of beamformer cells is positioned in the first layer to minimize routing distance to associated antenna elements.

Example 25 includes the subject matter of Example 24, and wherein each beamformer cell of the plurality of beamformer cells is positioned in the first layer to do one or both of minimize routing distance to associated antenna elements and increase a trace pitch associated with the multiplex feed network.

Example 26 includes the subject matter of any of Examples 24-25, and wherein each beamformer cell of the plurality of beamformer cells is positioned in the first layer to minimize number of beamformer cells in the particular arrangement.

Example 27 includes the subject matter of any of Examples 24-26, and wherein density of beamformer cells of the plurality of beamformer cells in a center portion of the particular arrangement is greater than density of beamformer cells of the plurality of beamformer cells in peripheral portions of the particular arrangement.

Example 28 includes the subject matter of any of Examples 24-27, and wherein a position of each beamformer cell within the particular arrangement is a function of a number of layers comprising the second layer in which the multiplex feed network is configured.

Example 29 includes the subject matter of any of Examples 24-28, and wherein the second layer comprises fourth and fifth layers, wherein electrically conductive traces in a first orientation included in the multiplex feed network are located in the fourth layer, and wherein electrically conductive traces in a second orientation, different from the first orientation, included in the multiplex feed network are located in the fifth layer.

Example 30 includes the subject matter of any of Examples 24-29, and wherein the multiplex feed network comprises at least three multiplex feed networks.

Example 31 includes the subject matter of any of Examples 24-30, and wherein the second layer comprises fourth, fifth, sixth, and seventh layers, wherein electrically conductive traces in a first orientation included in the multiplex feed network are located in the fourth and sixth layers, and wherein electrically conductive traces in a second orientation, different from the first orientation, included in the multiplex feed network are located in the fifth and seventh layers.

Example 32 includes the subject matter of any of Examples 24-31, and wherein the multiplex feed network comprises an H-network.

Example 33 includes the subject matter of any of Examples 24-32, and wherein a position of one of more of the beamformer cells within the particular arrangement is a function of an arrangement of the plurality of antenna elements in the third layer.

Example 34 includes the subject matter of any of Examples 24-33, and wherein the beamformer includes a plurality of phase shifters and comprises an integrated circuit (IC) chip.

Example 35 includes the subject matter of any of Examples 24-34, and wherein the plurality of inputs and the plurality of outputs are distributed on all sides of the IC chip.

Example 36 includes the subject matter of any of Examples 24-35, and wherein the IC chip is physically rotated relative to the plurality of input vias and the plurality of output vias to reduce a distance between adjacent beamformer cells.

Example 37 includes the subject matter of any of Examples 24-36, and wherein the antenna element of the plurality of antenna elements is included in an antenna module, the antenna module further including an amplifier electrically coupled with the antenna element.

Example 38 includes the subject matter of any of Examples 24-37, and wherein the antenna module is included in the third layer.

Example 39 includes the subject matter of any of Examples 24-38, and wherein the first, second, and third layers comprise discrete printed circuit board (PCB) layers in a PCB stack.

Example 40 includes the subject matter of any of Examples 24-39, and wherein one or more of the first, second, and third layers comprises a substrate, a printed circuit board (PCB), a ceramic board, or a sub-layer of a layer.

Example 41 includes the subject matter of any of Examples 24-40, and wherein an electrical signal pathway length between each pair of the output and the antenna element is equidistant to each other.

Example 42 includes the subject matter of any of Examples 24-41, and wherein each beamformer cell of the plurality of beamformer cells further comprises a plurality of radio frequency (RF) filters, wherein each RF filter of the plurality of RF filters is disposed between and electrically couples to a respective output of the plurality of outputs and a respective output via of the plurality of output vias.

Example 43 is an apparatus, which includes:
a plurality of first electrically conductive traces oriented in a first direction in a first layer of a stack;
a plurality of second electrically conductive traces oriented in a second direction, different from the first direction, in a second layer of the stack;
a plurality of first vias electrically coupling the plurality of first electrically conductive traces to respective traces of the plurality of second electrically conductive traces to define a plurality of first hierarchical networks;
a plurality of third electrically conductive traces oriented in the first direction in a third layer of the stack;
a plurality of fourth electrically conductive traces oriented in the second direction in a fourth layer of the stack; and
a plurality of second vias electrically coupling the plurality of third electrically conductive traces to respective traces of the plurality of fourth electrically conductive traces to define a plurality of second hierarchical networks,
wherein open ends of the first or second traces at a last stage of the plurality of first hierarchical networks comprise a plurality of first ends and open ends of the third or fourth traces at a last stage of the plurality of second hierarchical networks comprise a plurality of second ends, and wherein a first end of the plurality of first ends and a corresponding second end of the plurality of second ends are non-collinear to each other in a direction perpendicular to a major plane of the first layer.

Example 44 includes the subject matter of Example 43, and wherein at least one of the first or second traces at the last stage of the plurality of first hierarchical networks has a different shape than at least one of the third or fourth traces at the last stage of the plurality of second hierarchical networks.

Example 45 includes the subject matter of any of Examples 43-44, and wherein the first and second traces at the last stage of the plurality of first hierarchical networks and the third and fourth traces at the last stage of the plurality of second hierarchical networks are length matched to each other.

Example 46 includes the subject matter of any of Examples 43-45, and wherein the plurality of first hierarchical networks comprises H-networks.

Example 47 includes the subject matter of any of Examples 43-46, and wherein the plurality of first hierarchical networks comprises at least three hierarchical networks.

Example 48 includes the subject matter of any of Examples 43-47, and wherein hierarchical networks of the plurality of first hierarchical networks are electrically isolated from one another.

Example 49 includes the subject matter of any of Examples 43-48, and wherein respective traces of the plurality of first electrically conductive traces are parallel and offset from one another, and wherein respective traces of the plurality of second electrically conductive traces are parallel and offset from one another.

Example 50 is an apparatus, which includes:
a beamformer including a plurality of inputs and a plurality of outputs, and the beamformer included in a first printed circuit board (PCB) layer;
a plurality of input vias, wherein each input of the plurality of inputs electrically couples to a respective input via of the plurality of input vias;
a first electrically conductive trace segment extending from a first last stage node of a first hierarchical network, wherein the first electrically conductive trace segment includes a first termination end at an end opposite the first last stage node, wherein the first termination end electrically couples to a first input via of the plurality of input vias; and
a second electrically conductive trace segment extending from a second last stage node of a second hierarchical network, wherein the second electrically conductive trace segment includes a second termination end at an end opposite the second last stage node, wherein the second termination end electrically couples to a second input via of the plurality of input vias,
wherein the first hierarchical network is disposed above and aligned with the second hierarchical network, wherein the first and second electrically conductive trace segments are differently shaped from each other.

Example 51 includes the subject matter of Example 50, and wherein the first and second termination ends are located non-collinear to each other with respect to a direction perpendicular to the first PCB layer.

Example 52 includes the subject matter of any of Examples 50-51, and wherein the first and second electrically conductive trace segments are length matched to each other.

Example 53 includes the subject matter of any of Examples 50-52, and wherein respective nodes of the first and second hierarchical networks are collinear with each other in a direction perpendicular to the first PCB layer.

Example 54 includes the subject matter of any of Examples 50-53, and wherein the first hierarchical network is provided on second and third PCB layers and the second hierarchical network is provided on third and fourth PCB layers.

Example 55 includes the subject matter of any of Examples 50-54, and wherein electrically conductive traces in a first orientation included in the first hierarchical network are located in the second PCB layer, electrically conductive traces in a second orientation, different from the first orientation, included in the first hierarchical network are located in the third PCB layer, electrically conductive traces in the first orientation included in the second hierarchical network are located in the third PCB layer, and electrically conductive traces in the second orientation included in the second hierarchical network are located in the fourth PCB layer.

Example 56 includes the subject matter of any of Examples 50-55, and wherein each of the first and second hierarchical networks comprises more than one hierarchical network.

Example 57 includes the subject matter of any of Examples 50-56, and wherein the plurality of outputs of the beamformer electrically couples to a respective antenna element of a plurality of antenna elements, and wherein each input of the plurality of inputs is associated with a different beam or channel.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The embodiments of the invention in which an exclusive property or privilege is claimed are defined as follows:

1. An apparatus comprising:
   a plurality of first electrically conductive traces oriented in a first direction in a first layer of a stack;
   a plurality of second electrically conductive traces oriented in a second direction, different from the first direction, in a second layer of the stack;
   a plurality of first vias electrically coupling the plurality of first electrically conductive traces to respective traces of the plurality of second electrically conductive traces to define a plurality of first hierarchical networks;
   a plurality of third electrically conductive traces oriented in the first direction in a third layer of the stack;
   a plurality of fourth electrically conductive traces oriented in the second direction in a fourth layer of the stack; and
   a plurality of second vias electrically coupling the plurality of third electrically conductive traces to respective traces of the plurality of fourth electrically conductive traces to define a plurality of second hierarchical networks,
   wherein open ends of the first or second traces at a last stage of the plurality of first hierarchical networks comprise a plurality of first ends and open ends of the third or fourth traces at a last stage of the plurality of second hierarchical networks comprise a plurality of second ends, and wherein a first end of the plurality of first ends and a corresponding second end of the plurality of second ends are non-collinear to each other in a direction perpendicular to a major plane of the first layer.

2. The apparatus of claim 1, wherein at least one of the first or second traces at the last stage of the plurality of first hierarchical networks has a different shape than at least one of the third or fourth traces at the last stage of the plurality of second hierarchical networks.

3. The apparatus of claim 1, wherein the first and second traces at the last stage of the plurality of first hierarchical networks and the third and fourth traces at the last stage of the plurality of second hierarchical networks are length matched to each other.

4. The apparatus of claim 1, wherein the plurality of first hierarchical networks comprises H-networks.

* * * * *